(12) United States Patent
Beckhardt et al.

(10) Patent No.: US 11,284,214 B2
(45) Date of Patent: *Mar. 22, 2022

(54) FAILURE RECOVERY OF WEARABLE PLAYBACK DEVICE

(71) Applicant: Sonos, Inc., Santa Barbara, CA (US)

(72) Inventors: Steven Beckhardt, Boston, MA (US); Jonathan Paul Lang, Santa Barbara, CA (US); Jonathon Reilly, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,143

(22) Filed: Feb. 10, 2020

(65) Prior Publication Data

US 2020/0178019 A1 Jun. 4, 2020

Related U.S. Application Data

(63) Continuation of application No. 15/946,561, filed on Apr. 5, 2018, now Pat. No. 10,560,796, which is a (Continued)

(51) Int. Cl.
*H04S 7/00* (2006.01)
*H04N 21/43* (2011.01)
(Continued)

(52) U.S. Cl.
CPC .............. *H04S 7/308* (2013.01); *G06F 3/165* (2013.01); *H04L 65/604* (2013.01);
(Continued)

(58) Field of Classification Search
CPC ......... H04N 21/4425; H04N 21/43615; H04N 21/8113; H04S 7/308; H04S 7/00;
(Continued)

(56) References Cited

U.S. PATENT DOCUMENTS 3,584,153 A 6/1971 Kinzer
5,440,644 A 8/1995 Farinelli et al.
(Continued)

FOREIGN PATENT DOCUMENTS

CN 201311781 Y 9/2009
EP 1389853 A1 2/2004
(Continued)

OTHER PUBLICATIONS

Advisory Action dated Sep. 19, 2017, issued in connection with U.S. Appl. No. 14/808,872, filed on Jul. 24, 2015, 3 pages.
(Continued)

*Primary Examiner* — Melur Ramakrishnaiah
(74) *Attorney, Agent, or Firm* — Akerman LLP

(57) ABSTRACT

An example implementation may involve a group of wearable playback devices including a first wearable playback device and a second wearable playback device. The wearable playback devices render multi-channel audio content according to particular playback responsibilities in the group. When a failure or other issue with the second wearable playback device occurs, the first playback device assumes at least part of the playback responsibility of the second playback device.

21 Claims, 12 Drawing Sheets

Related U.S. Application Data continuation of application No. 14/808,872, filed on Jul. 24, 2015, now Pat. No. 9,940,091, which is a continuation of application No. 14/630,969, filed on Feb. 25, 2015, now Pat. No. 9,400,632, which is a continuation of application No. 14/521,682, filed on Oct. 23, 2014, now Pat. No. 9,507,560, which is a continuation of application No. 13/489,674, filed on Jun. 6, 2012, now Pat. No. 8,903,526.

(51) Int. Cl.
| | |
|---|---|
| H04N 21/436 | (2011.01) |
| H04N 21/4425 | (2011.01) |
| H04N 21/81 | (2011.01) |
| H04R 27/00 | (2006.01) |
| H04L 65/60 | (2022.01) |
| G06F 3/16 | (2006.01) |
| H04R 5/04 | (2006.01) |
| H04R 29/00 | (2006.01) |
| H04S 3/00 | (2006.01) |

(52) U.S. Cl.
CPC ... *H04N 21/4302* (2013.01); *H04N 21/43615* (2013.01); *H04N 21/4425* (2013.01); *H04N 21/8113* (2013.01); *H04R 5/04* (2013.01); *H04R 27/00* (2013.01); *H04R 29/001* (2013.01); *H04R 2227/005* (2013.01); *H04R 2420/03* (2013.01); *H04R 2420/05* (2013.01); *H04S 3/008* (2013.01); *H04S 7/00* (2013.01)

(58) Field of Classification Search
CPC ........ H04R 27/00; H04R 5/04; H04R 29/001; H04R 2227/05; H04R 2420/03; H04R 2420/05; G06F 3/165
USPC .......................................................... 700/94
See application file for complete search history.

(56) References Cited

U.S. PATENT DOCUMENTS

| | | | |
|---|---|---|---|
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | Dilorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,095,455 | B2 | 8/2006 | Jordan et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,251,332 | B2 | 7/2007 | Eves |
| 7,295,548 | B2 | 11/2007 | Blank et al. |
| 7,483,538 | B2 | 1/2009 | Mccarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | Mcaulay et al. |
| 7,853,341 | B2 | 12/2010 | Mccarty et al. |
| 7,876,907 | B2 | 1/2011 | Kawada et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | Mccarty et al. |
| 8,190,680 | B2 | 5/2012 | Spilo et al. |
| 8,234,395 | B2 | 7/2012 | Millington |
| 8,401,680 | B2 | 3/2013 | Kohyama et al. |
| 8,483,853 | B1 | 7/2013 | Lambourne |
| 8,675,892 | B2 | 3/2014 | Hogue et al. |
| 9,245,514 | B2 | 1/2016 | Donaldson |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2003/0185400 | A1 | 10/2003 | Yoshizawa et al. |
| 2004/0024478 | A1 | 2/2004 | Hans et al. |
| 2006/0149850 | A1 | 7/2006 | Bowman |
| 2006/0287745 | A1* | 12/2006 | Richenstein ........... H04H 20/89 700/94 |
| 2007/0087686 | A1* | 4/2007 | Holm ........................ H04S 7/30 455/3.06 |
| 2007/0142944 | A1 | 6/2007 | Goldberg et al. |
| 2009/0060219 | A1 | 3/2009 | Inohara |
| 2009/0081948 | A1 | 3/2009 | Banks et al. |
| 2009/0082888 | A1 | 3/2009 | Johansen |
| 2009/0169030 | A1 | 7/2009 | Inohara |
| 2009/0171487 | A1 | 7/2009 | Wilhelm |
| 2009/0296954 | A1 | 12/2009 | Hooley et al. |
| 2010/0034393 | A1 | 2/2010 | Sorek et al. |
| 2011/0015769 | A1 | 1/2011 | Haatainen |
| 2011/0289545 | A1* | 11/2011 | Eguchi ............. H04N 21/43637 725/127 |
| 2012/0144435 | A1* | 6/2012 | Spilo ................ H04N 21/43615 725/78 |
| 2013/0021531 | A1 | 1/2013 | Eguchi et al. |

FOREIGN PATENT DOCUMENTS

| | | |
|---|---|---|
| EP | 1898674 | 3/2008 |
| EP | 2383996 | 2/2011 |
| EP | 2555514 A1 | 2/2013 |
| JP | 2002345099 A | 11/2002 |
| JP | 2003009298 | 1/2003 |
| JP | 2003047098 | 2/2003 |
| JP | 2004236163 | 8/2004 |
| JP | 2007174360 A | 7/2007 |
| JP | 2008092546 | 4/2008 |
| JP | 2010507294 A | 3/2010 |
| JP | 2010166481 A | 7/2010 |
| JP | 2011250130 | 12/2011 |
| JP | 2011250130 A | 12/2011 |
| JP | 2015527768 A | 9/2015 |
| KR | 1020060061656 | 6/2006 |
| WO | 200153994 | 7/2001 |
| WO | 2003093950 A2 | 11/2003 |
| WO | 2008046141 A1 | 4/2008 |
| WO | 2011122456 | 10/2011 |
| WO | 2011122456 A1 | 10/2011 |
| WO | 2013184792 A1 | 12/2013 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, 1st Office Action dated Sep. 21, 2017, issued in connection with CN Application No. 201380038902.8, 22 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action dated May 13, 2019, issued in connection with European Application No. 17210046.3, 4 pages.
European Patent Office, European Office Action dated Nov. 5, 2018, issued in connection with European Application No. 17210046.3, 5 pages.

(56) References Cited

OTHER PUBLICATIONS

European Patent Office, Examination Report dated Apr. 18, 2017, issued in connection with European Application No. 13801354.5, 5 pages.
European Patent Office, Extended European Search Report dated Jul. 8, 2016, issued in connection with European Patent Application No. 13801354.5, 13 pages.
European Patent Office, Extended Search Report dated Feb. 15, 2018, issued in connection with European Application No. 17210046.3, 7 pages.
European Patent Office, Office Action dated Jan. 2, 2017, issued in connection with European Application No. 15002532.8, 5 pages.
European Patent Office, Supplementary European Search Report dated Apr. 15, 2016, issued in connection with European Patent Application No. 15002532.8, 8 pages.
European Patent Office, Supplementary Partial European Search Report dated Mar. 15, 2016, issued in connection with European Patent Application No. EP13801354, 7 pages.
Final Office Action dated Jul. 12, 2017, issued in connection with U.S. Appl. No. 14/808,872, filed Jul. 24, 2015, 16 pages.
International Bureau, International Preliminary Report on Patentability, dated Dec. 18, 2014, issued in connection with International Application No. PCT/US2013/044300, filed on Jun. 5, 2013, 9 pages.
International Searching Authority, International Search Report dated Sep. 5, 2013, issued in connection with International Application No. PCT/US2013/044300, filed on Jun. 5, 2013, 3 pages.
International Searching Authority, Written Opinion dated Sep. 5, 2013, issued in connection with International Application No. PCT/US2013/044300, filed on Jun. 5, 2013, 9 pages.
Japanese Patent Office, Final Office Action dated Apr. 16, 2019, issued in connection with Japanese Patent Application No. 2017-135469, 7 pages.
Japanese Patent Office, Office Action dated Mar. 29, 2016, issued in connection with Japanese Patent Application No. JP2015-516169, 11 pages.
Japanese Patent Office, Office Action dated Nov. 29, 2016, issued in connection with Japanese Application No. 2015-516169, 4 pages.
Japanese Patent Office, Office Action dated Aug. 7, 2018, issued in connection with Japanese Application No. 2017-135469, 8 pages.
Japanese Patent Office, Translation of Office Action dated Apr. 16, 2019, issued in connection with Japanese Patent Application No. 2017-135469, 4 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 18, 2019, issued in connection with U.S. Appl. No. 15/946,561, filed Apr. 5, 2018, 19 pages.
Non-Final Office Action dated Mar. 21, 2016, issued in connection with U.S. Appl. No. 14/521,682, filed Oct. 23, 2014, 20 pages.
Non-Final Office Action dated Jan. 25, 2017, issued in connection with U.S. Appl. No. 14/808,872, filed Jul. 24, 2015, 16 pages.
Non-Final Office Action dated May 27, 2014, issued in connection with U.S. Appl. No. 13/489,674, filed Jun. 6, 2012, 13 pages.
Notice of Allowance dated Apr. 4, 2016, issued in connection with U.S. Appl. No. 14/630,969, filed Feb. 25, 2015, 9 pages.
Notice of Allowance dated Oct. 7, 2014, issued in connection with U.S. Appl. No. 13/489,674, filed Jun. 6, 2012, 7 pages.
Notice of Allowance dated Sep. 20, 2019, issued in connection with U.S. Appl. No. 15/946,561, filed Apr. 5, 2018, 7 pages.
Notice of Allowance dated Jul. 28, 2016, issued in connection with U.S. Appl. No. 14/521,682, filed Oct. 23, 2014, 8 pages.
Notice of Allowance dated Nov. 30, 2017, issued in connection with U.S. Appl. No. 14/808,872, filed Jul. 24, 2015, 8 pages.
Palm, Inc., "Handbook for the Palm VII Handheld," May 2000, 311 pages.
Presentations at WinHEC 2000, May 2000, 138 pages.
Supplemental Notice of Allowability dated May 24, 2016, issued in connection with U.S. Appl. No. 14/630,969, filed Feb. 25, 2015, 4 pages.
Supplemental Notice of Allowance dated Oct. 3, 2016, issued in connection with U.S. Appl. No. 14/521,682, filed Oct. 23, 2014, 5 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, First Office Action and Translation dated Jun. 30, 2020, issued in connection with Chinese Application No. 201810780364.4, 23 pages.
Chinese Patent Office, Second Office Action and Translation dated Apr. 6, 2021, issued in connection with Chinese Application No. 201810780364.4, 10 pages.
Chinese Patent Office, Third Office Action and Translation dated Aug. 6, 2021, issued in connection with Chinese Application No. 201810780364.4, 15 pages.
Japanese Patent Office, Office Action and Translation dated Mar. 2, 2021, issued in connection with Japanese Patent Application No. 2019-214895, 7 pages.

* cited by examiner

FAILURE RECOVERY OF WEARABLE PLAYBACK DEVICE

CROSS REFERENCE TO RELATED APPLICATIONS

This application is a continuation of U.S. non-provisional patent application Ser. No. 15/946,561, filed on Apr. 5, 2018, entitled "Playback According to Playback Responsibility in Group," which is incorporated herein by reference.

U.S. non-provisional patent application Ser. No. 15/946,561 is a continuation of U.S. non-provisional patent application Ser. No. 14/808,872, filed on Jul. 24, 2015, entitled "Playback According to Playback Responsibility in Group," and issued as U.S. Pat. No. 9,940,091, which is incorporated herein by reference.

U.S. non-provisional patent application Ser. No. 14/808,872 is a continuation of U.S. non-provisional patent application Ser. No. 14/630,969, filed on Feb. 25, 2015, entitled "Playback According to Playback Responsibility in Stereo Pair," and issued as U.S. Pat. No. 9,400,632, which is incorporated herein by reference.

U.S. non-provisional patent application Ser. No. 14/630,969 is a continuation of U.S. non-provisional patent application Ser. No. 14/521,682, filed on Oct. 23, 2014, entitled "Device Playback Failure Recovery and Redistribution," and issued as U.S. Pat. No. 9,507,560, which also is incorporated herein by reference.

U.S. non-provisional patent application Ser. No. 14/521,682 is a continuation of U.S. non-provisional patent application Ser. No. 13/489,674, filed on Jun. 6, 2012, entitled "Device Playback Failure Recovery and Redistribution," and issued as U.S. Pat. No. 8,903,526, which is incorporated herein by reference.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the internet through an online store, an internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1A:
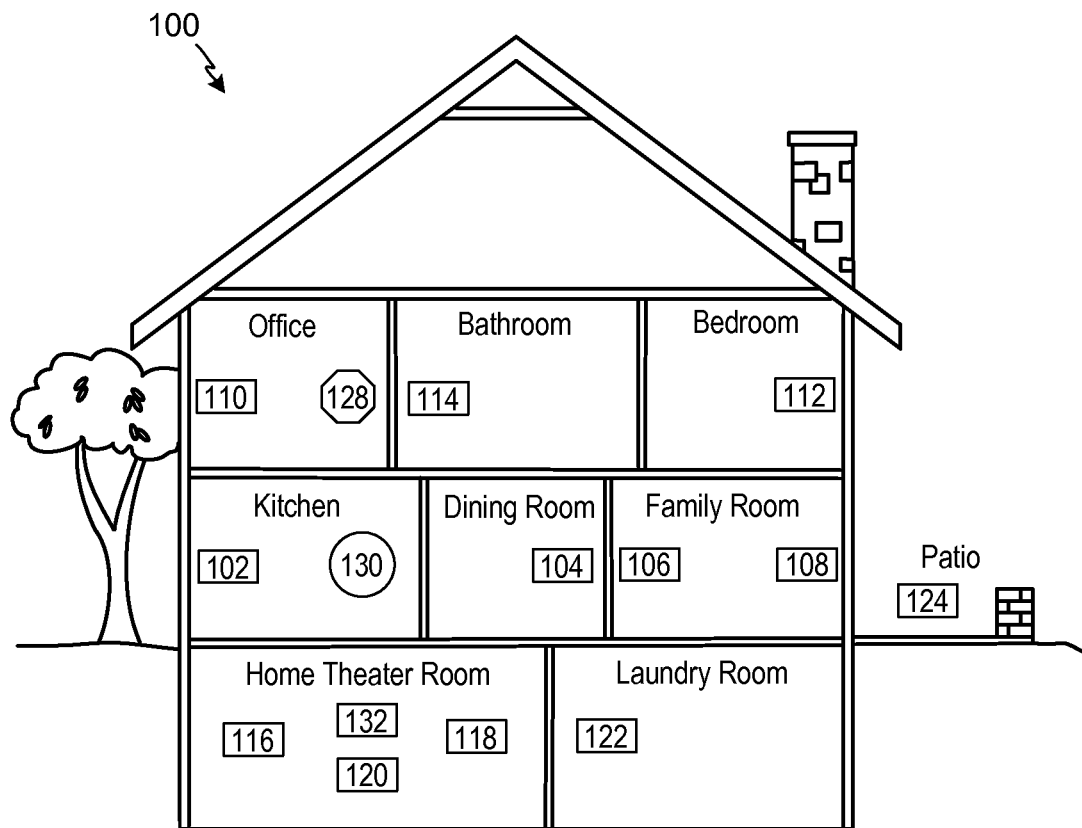
FIG. 1A shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Listening to audio content (e.g., music, talk radio, books, the audio from television, etc.) out loud may be a social activity that involves family, friends, or both. For example, in a household, people may play music out loud at parties and other social gatherings. In such an environment, people may wish to play the music in multiple listening zones simultaneously, such that the music in each listening zone may be synchronized, without audible echoes or glitches. Such an experience may be further enriched when people may browse audio sources, add a music track to a playback queue, learn more about a music track (such as track title or track artists), or view what music track is next in the playback queue. Listening to audio content out loud may also be an individual experience. For example, an individual may play music out loud for themselves in the morning before work, in the evening during dinner, or at other times throughout the day at home, work, or on the road. For these individual experiences, the individual may choose to either use headphones, or limit the out loud playback of audio content to a single zone or area.

Combining signal processing techniques with audio equipment that takes advantage of the signal processing can often enhance the listening experience. For example, multichannel audio, when reproduced appropriately, can create an experience where sounds appear to be coming from sources placed throughout the listening room as the audio recording was originally intended. As the number of channels increase, the experience can be enhanced such that a three-dimensional effect may eventually be achieved. In another example, using dedicated components to reproduce specific portions of the frequency spectrum, such as using a subwoofer for low-frequency audio, can create room-shaking sounds that further enhance the listening experience.

In the present application, systems and methods are provided to offer a unique wired, wireless, or both wired and wireless audio solution that allows audio content to be played in a single listening zone or across multiple listening zones simultaneously and in synchrony. The audio content may be played out loud or using headphones. In an example, such a system may include audio players, often referred to as zone players or players, and controllers, which may also be a player. The controllers may be used to control the system, and may include capabilities for browsing and selecting audio content for playback, viewing and editing audio content in one or more playback queues, or grouping and ungrouping zone players into one or more listening zones, etc. In a sense, the system may operate as a distributed system such that each controller has full control over the entire system, and each player has the ability to play audio content from the either a same audio source or a different audio source as another player.

The system may be configured to provide for device playback failure recovery and redistribution. In one example, a method is provided that comprises causing a plurality of playback devices to render audio content in a synchronized manner, detecting a failure of a first playback device of the plurality of playback devices, determining a playback responsibility of the first playback device, and causing an adjustment of the rendering of the audio content by at least a second playback device of the plurality of playback devices. The adjustment is based on the playback responsibility of the first playback device.

In another example, a method is provided that comprises causing a plurality of playback devices to render audio content in a synchronized manner, detecting an addition of a new playback device to the plurality of playback devices, determining a playback responsibility of the new playback device for rendering the audio content, and causing an adjustment of the rendering of the audio content by at least a one playback device from the plurality of playback devices. The adjustment is based on the playback responsibility of the first playback device.

In yet another example, a system is provided. The system includes one or more audio content sources, one or more audio playback devices, a controller, and a processing unit in communication with the audio content source, the one or more audio playback device, and the controller. The processing unit is configured to cause a plurality of playback devices to render audio content in a synchronized manner, detect a failure of a first playback device of the plurality of playback devices, determine a playback responsibility of the first playback device, and cause an adjustment of the rendering of the audio content by at least a second playback device of the plurality of playback devices. The adjustment is based on the playback responsibility of the first playback device.

With device playback failure recovery and redistribution implemented on the system, as described above, the system may provide graceful recovery when a playback device fails by automatically adjusting the playback of other playback devices in the system, thereby reducing the disruption of the user's audio experience to a minimum. Further, smooth redistribution of audio playback may also be provided when a new device is added by automatically adjusting the playback of other playback devices in the system, thereby improving the audio experience of the user in a subtle manner.

II. An Example Operating Environment

Referring now to the drawings, in which like numerals can refer to like parts throughout the figures, FIG. 1A shows an example system environment 100 in which one or more embodiments disclosed herein can be practiced or implemented.

By way of illustration, system environment 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system environment 100. Controller 130 may be fixed to a zone, or alternatively, mobile such that it can be moved about the zones. System environment 100 may also include more than one controller 130. System environment 100 illustrates an example whole house audio system, though it is understood that the technology described herein is not limited to its particular place of application or to an expansive system like a whole house audio system environment 100 of FIG. 1A.

Figure 1B:
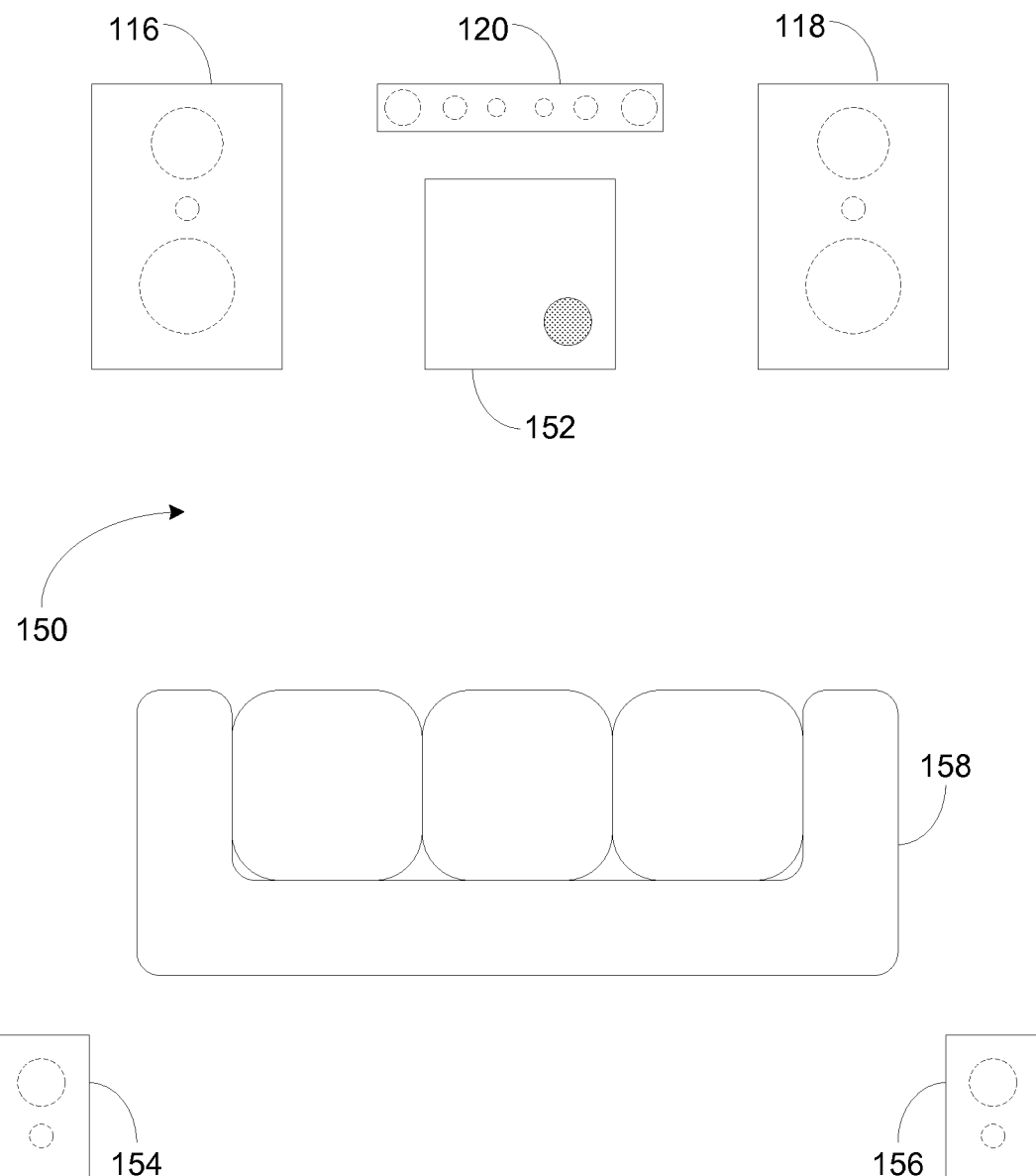
FIG. 1B shows an illustration of a second example system in which embodiments of the methods and apparatus disclosed herein can be implemented.

FIG. 1B shows an example home theater environment 150 including the zone players 116, 118, and 120 as shown in FIG. 1A. The example home theater environment 150 may further include zone players 152, 154, 156 and a couch 158. As shown, the home theater environment 150 may be configured as a 5.1 surround sound system around a user sitting on the couch 158, such that zone player 116 may be configured to be the front left speaker, zone player 120 may be configured to be the center speaker, zone player 118 may be configured to be the front right speaker, zone player 154 may be configured to be the left rear speaker, zone player 156 may be configured to be the right rear speaker, and zone player 152 may be configured to be the low-frequency subwoofer.

A. Example Zone Players

Figure 2A:
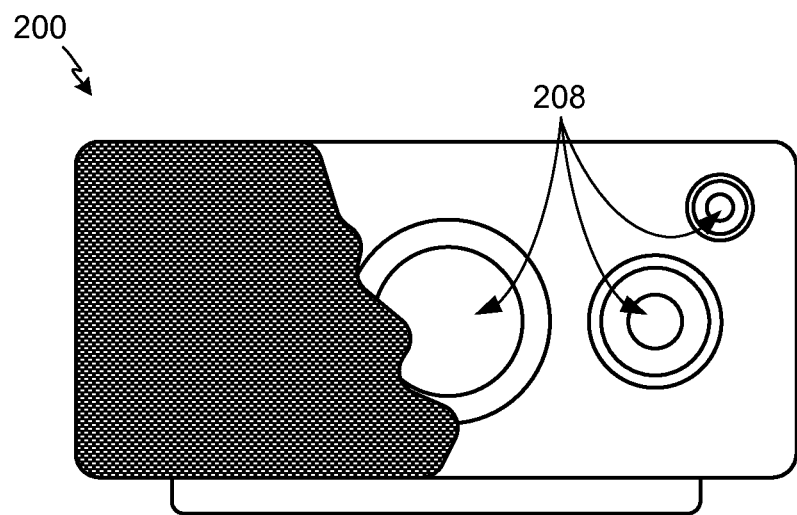
FIG. 2A shows an illustration of an example zone player having a built-in amplifier and speakers.
Figure 2B:
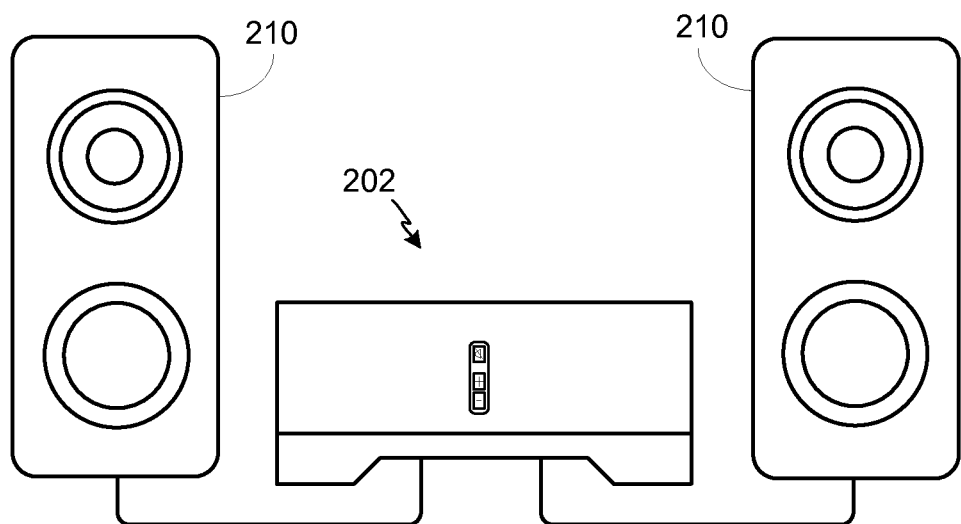
FIG. 2B shows an illustration of an example zone player having a built-in amplifier and connected to external speakers.
Figure 2C:
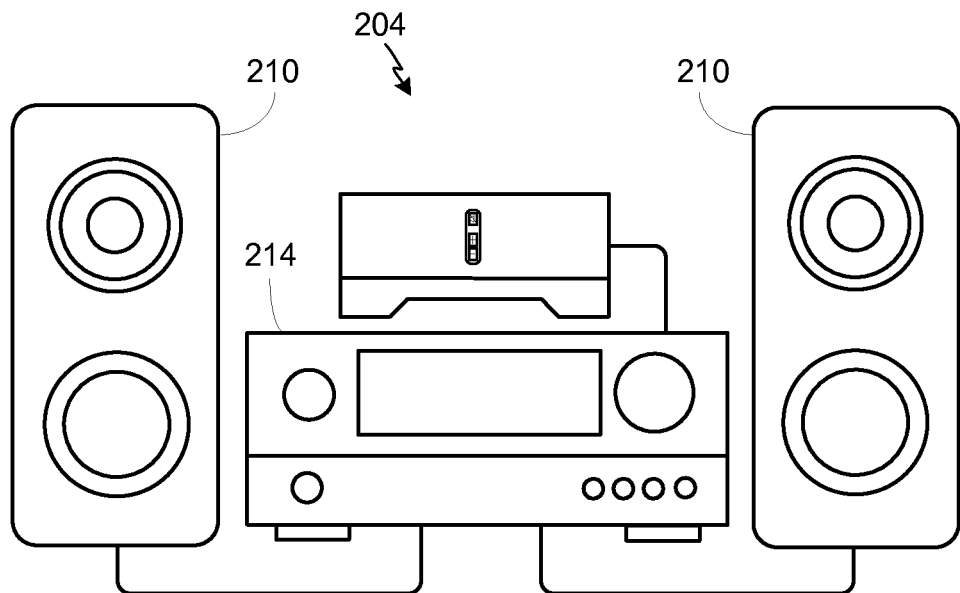
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124, and 152-156 of FIGS. 1A and 1B, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer might include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIGS. 1A and 1B, in some embodiments, one, some, or all of the zone players 102-124, and 152-156 can retrieve audio directly from a source. For example, a zone player may contain a playlist or queue of audio items to be played. Each item in the queue may comprise a uniform resource identifier (URI) or some other identifier. The URI or identifier can point the zone player to the audio source. The source might be found on the internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player might consist of a wired or wireless headphone. In yet another example, a zone player might include a sound bar for television. In yet another example, a zone player can include or interact with a docking station for an Apple iPod™ or similar device.

B. Example Controllers

Figure 3:
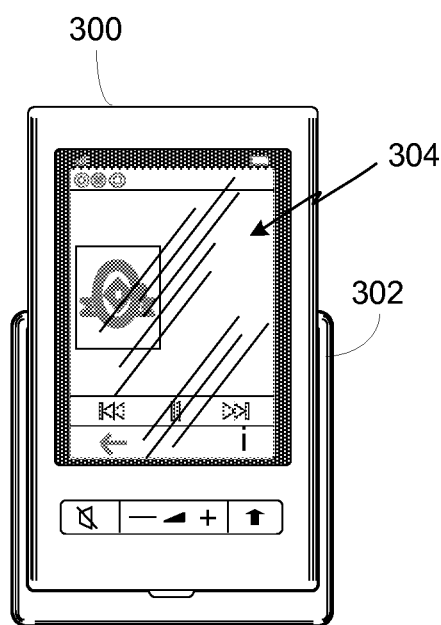
FIG. 3 shows an illustration of an example controller.

FIG. 3 illustrates an example wireless controller 300 in docking station 302. By way of illustration, controller 300 can correspond to controlling device 130 of FIG. 1A. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system environment 100, then each controller may be coordinated to display common content, and may all be dynamically updated to indicate changes made from a single controller. Coordination might happen, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone, or any other smart phone or network-enabled device can be used as controller 130. An application running on a laptop or desktop PC or Mac can also be used as controller 130. Such controllers may connect to system environment 100 through an interface with data network 128, a zone player, a wireless router, or using some other configured connection path. Example controllers offered by SONOS, Inc. of Santa Barbara, Calif. include a "Controller 200," "Sonos CONTROL," "Sonos® Controller for iPhone," "Sonos® Controller for iPad," "Sonos® Controller for Android, "Sonos® Controller for Mac or PC."

C. Example Data Connection

Zone players 102-124, and 152-156 of FIGS. 1A and 1B are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124, and 152-156 are wirelessly coupled to data network 128 based on a proprietary mesh network. In some embodiments, one or more of the zone players 102-124, and 152-156 are wirelessly coupled to data network 128 using a non-mesh topology. In some embodiments, one or more of the zone players 102-124, and 152-156 are coupled via a wire to data network 128 using Ethernet or similar technology. In addition to the one or more zone players 102-124, and 152-156 connecting to data network 128, data network 128 can further allow access to a wide area network, such as the internet.

In some embodiments, connecting any of the zone players 102-124, and 152-156 or some other connecting device, to a broadband router, can create data network 128. Other zone players 102-124, and 152-156 can then be added wired or wirelessly to the data network 128. For example, a zone player (e.g., any of zone players 102-124, and 152-156) can be added to the system environment 100 or home theater environment 150 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

D. Example Zone Configurations

A particular zone can contain one or more zone players. For example, the family room of FIG. 1A contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

E. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124, and 152-156 are numerous. In some embodiments, music on a zone player itself may be accessed and a played. In some embodiments, music from a personal library stored on a computer or networked-attached storage (NAS) may be accessed via the data network 128 and played. In some embodiments, internet radio stations, shows, and podcasts can be accessed via the data network 128. Music or cloud services that let a user stream and/or download music and audio content can be accessed via the data network 128. Further, music can be obtained from traditional sources, such as a microphone, a turntable or CD player, via a line-in connection to a zone player, for example. Audio content can also be accessed using a different protocol, such as AirPlay™ which is a wireless technology by Apple, Inc., for example. Audio content received from one or more sources can be shared amongst the zone players 102-124, and 152-156 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
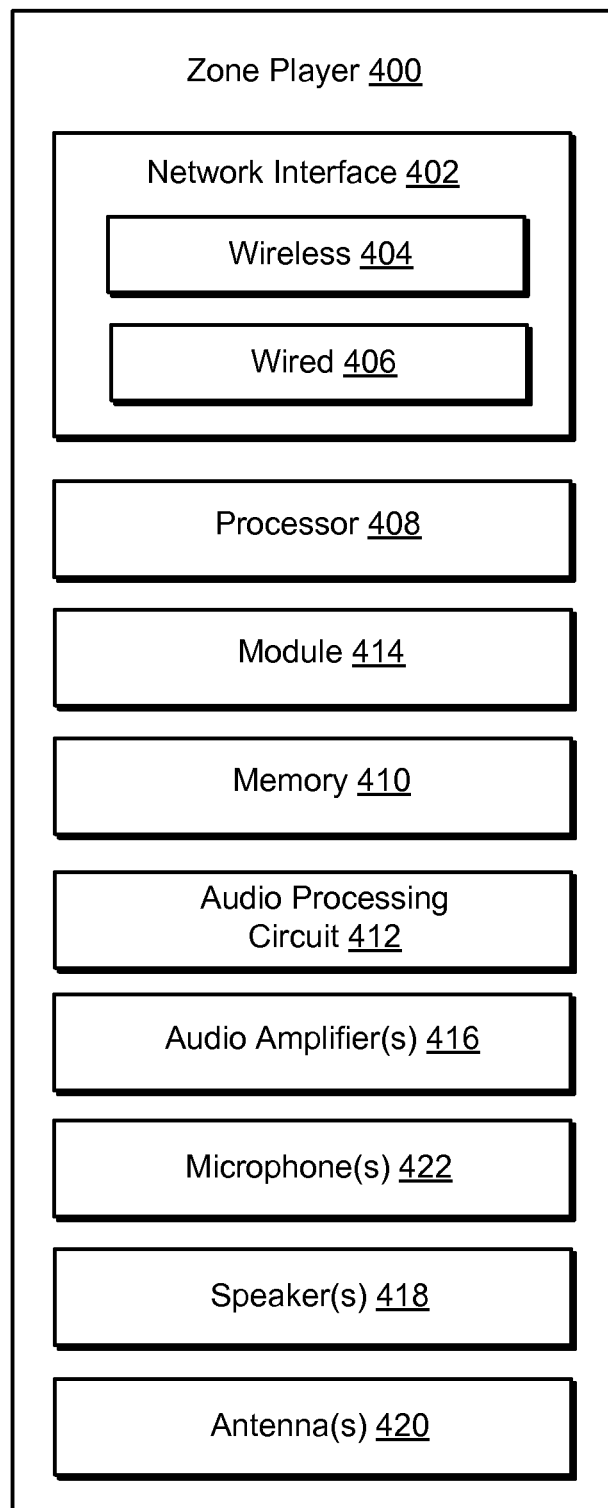
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, a microphone 422, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a URL or some other identifier). In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 or the microphone 422 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from internet radio stations, online music and video services, downloaded music, analog audio inputs, television, DVD, and so on, can be played from the PLAY:5.

IV. Controller

Figure 5:
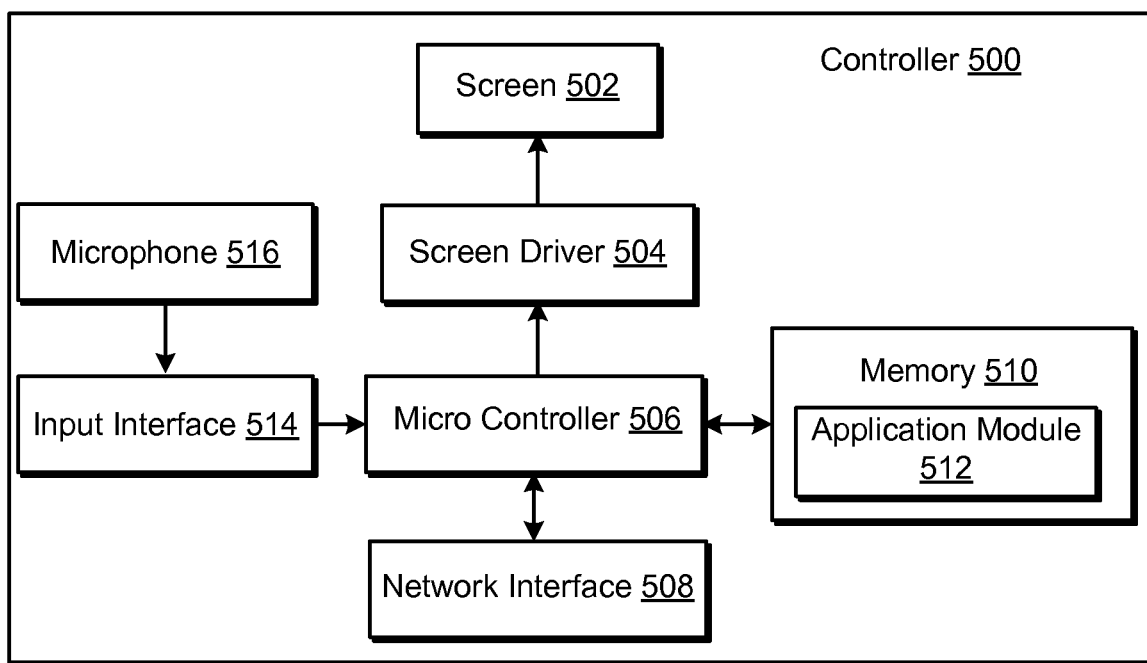
FIG. 5 shows an internal functional block diagram of an example controller.

Referring now to FIG. 5, there is shown an example block diagram for controller 500, which can correspond to the controlling device 130 in FIG. 1A. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The input interface 514 may be coupled to a microphone 516 for capturing audio signals, such as audio content or voice commands as control inputs. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no internet connection for an internet Radio station, and so on), a backup buzzer can be programmed to sound. The buzzer can include a sound file that is stored in a zone player, for example.

V. Bonded Zones

As suggested previously, a plurality of playback devices may render audio content as a collective. In such a case, the playback devices may be zone players in a "bonded zone." As related to the system environments 100 and 150, each of the zone players 102-124 and 152-156 may be grouped or "bonded" with one or more of the other zone players to playback audio content together. The zone players in the bonded zone may playback the audio content in a synchronized manner. In other words, each of the zone players playback audio content from an (e.g., identical) audio source or a list of audio sources in a synchronized manner such that no (or substantially no) unintentional audible delays or hiccups can be heard. In some cases, such as when a surround sound effect is desired, audible delays may be intentional, and may be implemented within the playback of the audio content. In another example, zone players in a bonded zone (also referred to as "bonded zone players") may playback audio in synchrony with one or more other zone players in the same zone or one or more different zones.

In a further example, a bonded zone may be described as either a "paired player" and/or a "consolidated player." In one case, the paired player may include two or more players in a bonded zone, whereby the players play at least some different audio channels of an audio source. For instance, a "stereo pair" may be a paired player created by grouping two players into a bonded zone to play audio content having a right channel and a left channel. In this instance, one of the players may play the right channel of the audio content, and the other player may play the left channel of the audio content. In another case, the paired player may include two or more players in the bonded zone, whereby the players play one or more of the same audio content channels as another (e.g., center channel) in addition to the right or left channel.

In a further case, the paired player may include three or more players grouped together into a bonded zone to play 2.1 audio. In this case, a first player may play the right channel of the audio content, a second player may play the left channel audio content, and a third player may play a low-frequency effects (LFE) component of the audio content. Referring to FIG. 1B, playback device 116 may render the left channel audio content, playback device 118 may render the right channel audio content, and playback device 152 may render the LFE component of the audio content. In these cases, as discussed, certain sound effects of multi-channel audio content may be reproduced and further enhanced by grouping multiple zone players into a bonded zone to playback audio content as a single paired player.

In one case, the consolidated player may include two or more players grouped into a bonded zone to playback a frequency range or a portion of the frequency range of the audio content. For instance, a consolidated player may include a full-frequency range player and a low-frequency range player (e.g., subwoofer). In this instance, the full-frequency range player may play the mid-frequency and high-frequency components of the audio content, and the low-frequency range player (subwoofer) may play the low-frequency component of the audio content. Referring to FIG. 1B, playback device 120 may be a full-frequency range player rendering the mid-frequency and high-frequency components of the audio content, while playback device 152 may be rendering the LFE component of the audio content. In another case, a consolidated player may include two full-frequency range players grouped together into a bonded zone. In this case, both players may be configured to playback the full frequency range of the audio content. As such, the total sound pressure level (SPL) output may be increased. Further in this case, different frequency components or frequency range components of the audio content may be routed to different drivers of the zone players in the consolidated player to prevent signal cancellation and other undesired effects.

In a further case, the bonded zone may be of both a consolidated player as well as a paired player. For instance, the bonded zone may include a low-frequency range player, and two full-frequency range players such that the bonded zone may be configured such that the low-frequency range players may playback the low-frequency component of the audio content, while one of the full-frequency range players may playback mid-frequency and high-frequency components of a right channel component of the audio content, and the other of the full-frequency range players playback mid-frequency and high-frequency components of a left channel component of the audio content. Referring to FIG. 1B, playback device 116 may render the mid-frequency and high-frequency components of a right channel component of the audio content, playback device 118 may render the mid-frequency and high-frequency components of a left channel component of the audio content, and playback device 152 may render the low-frequency component of the audio content.

As noted above, zone players 102-124 and 152-156 may be grouped into and ungrouped from bonded zones dynamically. The grouping and ungrouping may be performed via a control interface, such as a wireless controller, rather than by physically connecting and/or reconnecting speaker wires between discrete speakers or speaker systems, for example. Bonded zones (i.e., paired players and/or consolidated players) may further be grouped with other zone players and/or bonded zones to create yet another (i.e., nested) bonded zone for synchronized playback of audio content.

In one example, when a bonded zone is created or when a player is added to a bonded zone, such as by user command inputs through a controller, each player of the bonded zone may update a state variable associated with each zone player indicating that the respective zone player is included in the particular bonded zone. For instance, if a zone player is currently part of a bonded zone, the state variable associated with the zone player may indicate the bonded zone that the zone player is a part of. In one case, the state variable associated with the zone player may be stored in a readable data storage medium physically located on, or in communication with the zone player. In another case, a controller in the system may query a zone player for the state variable of the zone player to identify whether a zone player is in a bonded zone, and which bonded zone the zone player is in. The controller may then display bonded zone information of the zone player. For instance, the controller may display that the zone player is a part of a paired or consolidated player in a bonded zone. In another case, the state variable associated with the zone player may be stored on a readable data storage medium physically located on, or in communication with a master zone player, in the controller, or some other accessible location, such as a cloud network. The master zone player, which may also be referred to as a primary zone player or primary playback device will be discussed in further detail below.

State Variables

As discussed above, a state variable associated with a zone player may indicate a bonded zone that the zone player is part of. In one example, the state variable may further indicate a status (e.g., active or failed) of the zone player and/or audio capabilities of the zone player. In a case where state variables for each zone player in a bonded zone is stored on a master or primary zone player, the information contained in the state variables for each zone player is readily available through the master/primary zone player. In this case, the state variable for the master/primary zone player may indicate that the zone player is the master/primary zone player. In another case, where state variables for each zone player are stored on each respective zone player, information contained in the state variables may be acquired through communication between each of the zone players in the bonded zone. In a further case, a portion of the state variables associated with a zone player may be stored on the respective zone players, while other portions of the state variables associated with the zone player may be stored on the primary zone player. In yet another case, state variables associated with a subset of zone players in the bonded zone may be stored on the respective zone players, while state variables associated with other zone players in the bonded zone may be stored on the primary zone player. In either the case the state variables are stored on a subset of zone players, or the case a portion of the state variables are stored on the zone players (while other portions are stored on the primary zone player), the complete state variables for a zone player may be obtained through a series of query and response communications.

For retrieval of zone player information, the state variable indicating a status of a particular zone player in a bonded zone may be acquired by a simple query and response between the primary zone player and the particular zone player. In another instance, a controller in the system may identify the status of a particular zone player by retrieving the state variable of the particular zone player through querying the zone player (or in some cases, the primary zone player or other zone players in the bonded zone) for the associated state variable. The controller may then display the status information (or other information indicated by the associated state variable) a display screen.

Synchronous Playback

As mentioned above, the zone players in a bonded zone may be configured to playback audio content (whether as a paired player or consolidated player) in a synchronized manner. For rendering audio content in a synchronized manner, the bonded zone may be configured to include a master playback device/zone player, which may also be referred to as primary playback device/zone player. The bonded zone may accordingly include and one or more slave playback devices/zone players, which may also be referred to as secondary playback devices/zone players. In one example, the primary zone player may be configured to coordinate the synchronous playback of audio content by the zone players in the bonded zone.

In one example, the primary zone player of the bonded zone may be configured to coordinate the synchronous playback by sending an audio stream of the audio content and playback timing information for the audio content to the secondary zone players in the bonded zone.

It another example, the bonded zone may be part of a zone group such that the bonded zone plays audio content in synchrony with other zone players in different zones and/or zone groups. In this case, each zone player in the bonded zone may be configured to not only play in synchrony with the other zone players in the bonded zone, but also play in synchrony with other zone players in the different zones and/or zone groups. In one example, a zone group may include a master playback device/zone player which may be referred to as a "zone group coordinator." The zone group coordinator may be responsible for coordinating synchronous playback of audio content among the zone players in the zone group. In one case, the zone group coordinator may take a sample audio stream from the audio source and package the sample audio stream into frames. In this case, each frame of the sample audio stream may be associated with a playback time relative to the local playback time of the zone group coordinator. Each of the zone players in the zone group may be responsible for independently correlating their local time with the local time of the zone group coordinator such that each zone player in the zone group, including the zone group coordinator in some instances, may playback the audio frames in synchrony.

In one example, the primary zone player of a bonded zone may be a secondary zone player of a zone group configured to playback audio content in synchrony. In one case, the primary zone player may be configured to receive the sample audio stream packaged into frames, with timing information relative to the local playback time of the zone group coordinator. The primary player may then replace the received timing information with a corresponding local playback time of the primary zone player before retransmitting the sample audio stream frames to the secondary zone players within the bonded zone. In this case, the secondary zone players may only be required to synchronize playback with the primary zone player, which is synchronized with the zone group coordinator, rather than synchronizing with both the primary zone player and the zone group coordinator.

In another case, one or more zone players in the bonded zone may be a secondary player of the zone group and may individually be configured to receive the sample audio stream packaged into frames with timing information relative to the local playback time of the zone group coordinator. In this case, the secondary zone players may therefore be configured to individually synchronize playback with the zone group coordinator directly, rather than through the primary zone player of the bonded zone. As such, the primary zone player of the bonded zone may synchronize playback with the zone group coordinator, similar to the secondary zone players of the bonded zone, without further communication with the secondary zone players of the bonded zone to achieve synchronous playback.

In another example, the primary zone player of the bonded zone may also be the zone group coordinator for a zone group configured to playback audio content in synchrony. In this case, the primary zone player may be responsible for synchronizing both the players in the bonded zone as well as the players in the zone group. In such a case, translation of playback timing information may not be necessary.

Audio Equalization

In one example, equalization of audio content being played back in the bonded zone may be coordinated among the zone players of the bonded zone such that the synchronous playback may sound like that of a single playback device. As discussed above, different zone players may play different audio channels and/or different portions of the audio frequency range. In one case, the playback timing may be intentionally different (e.g., delayed) between different zone players or different drivers within one or more zone players, as mentioned above, for the purposes of creating a surround sound environment, for example. In another case, the balance or volume played by each zone player may be different. In this case, the equalization of the audio content may be performed according to signal processing algorithms (e.g., digital signal processing or DSP algorithms) by a general-purpose processor or a dedicated audio processing module (e.g., DSP chip or audio codec with processing capabilities).

In one example, a complete stream of the audio content may be sent to each zone player in the bonded zone. Each zone player may then be configured to independently apply signal processing to the audio content stream according to a playback responsibility of the respective zone player, defined as the audio content channel and/or audio content frequency range the respective zone player may be responsible for. The playback responsibility of a zone player may also include a volume level, or playback delay the zone player may be responsible for providing. In one case, each player in a stereo pair may receive the full frequency audio stream and independently remove (i.e., filter out) the audio content channel (left or right) the zone player is not responsible for providing, for example. In another case where a full-frequency range zone player is grouped with a low-frequency range zone player (subwoofer), each zone player may receive the full-frequency audio stream and remove (i.e., filter out) the audio frequency range (above or below a crossover frequency) the zone player is not responsible for providing. In either of these cases, other playback parameters, such as balance, volume level, and/or timing delay may be provided to each zone player for the respective zone players to adjust accordingly.

In another example, the primary zone player may perform the corresponding signal processing on the audio content, and send to each secondary zone player, the (e.g., filtered) audio content the corresponding audio content stream the secondary zone player may be responsible for. In one case, the primary player in a stereo pair may receive the full audio content stream and may be configured to separate the left and right channel audio contents for playback. If, for instance, the primary zone player is responsible for playing left channel audio content, the primary zone player may provide only the right channel audio content to the secondary player for playback. In another case, a full-frequency range zone player may be grouped with a subwoofer. In this case, the primary zone player may receive the full-frequency range audio content stream and may be configured to process/filter the full-frequency range audio content for the secondary player. For instance, if the full-frequency range zone player is the primary player, then the full-frequency range zone player may process the full-frequency range audio content and sends only the low-frequency range audio content to the secondary player, which is the subwoofer. In either of these cases, other playback parameters, such as balance, volume level, and/or timing delay may be adjusted at the primary zone player before being provided to the secondary zone player.

In a further example, a combination of the two configurations discussed above may be implemented. For instance, the primary zone player may be configured to perform a degree of preliminary signal processing (e.g., filtering) before sending the processed audio content stream to the secondary zone players. In this instance, the secondary zone player may be configured to receive the partially processed audio content stream and complete the signal processing of the audio content stream before playing the audio content stream.

Group Communication

As indicated above, the synchronized playback of audio content by a plurality of zone player may benefit from reliable and properly coordinated communication between each of the zone players. In one example, a group communication method may be implemented to coordinate activity among zone players in a bonded zone.

In one scenario, the bonded zone may benefit from a group communication method configured such that each zone player in the bonded zone is guaranteed to have received instructions for playback or other actions prior to execution of the instructions. For example, if a user using a user interface chooses to modify the audio equalization of the audio content by increasing the bass or treble frequency ranges, it may be desirable for each of the zone players in the bonded zone to have received the instructions before any individual zone player performs the equalization adjustment. In other scenario, it may be desirable for zone players in the bonded zone to execute the instructions as soon as possible, even if one or more zone players in the bonded group has not received the instructions. For example, if a user using a user interface chooses to mute, pause, or stop playback of audio content in the bonded zone, it may be desirable for each of the zone players to immediately mute, pause, or stop playback, regardless of the status of other zone players in the bonded group.

In one example, a confirmed communication list (CCL) may be generated to facilitate communication between zone players in a bonded zone. In one example, the CCL may be a list of all zone players in the bonded zone, starting with the primary zone player and including each secondary zone player. In one case, the list may be generated in an order based on an optimal routing (e.g., using the least amount of hops or transition points in the network) from the primary zone player to the secondary zone players. In another case, the list may be generated without consideration of network routing optimizations. In either case, communication from the primary zone player to the one or more secondary players in the CCL may be performed in a linear or serial manner. In this instance, the primary zone player may send the instruction to a first secondary zone player on the CCL, and the first secondary zone player, after receiving the instruction, may in turn forward the instruction to the next secondary zone player on the CCL. This sequence of a secondary zone player receiving the instruction and subsequently forwarding the instruction to the next secondary zone player continues until each of the zone players in the bonded zone have received the instruction.

When the last secondary zone player has received the instruction, the last secondary zone player may then execute the instruction, and subsequently send an acknowledgement message back to the second-to-last secondary zone player. After receiving the acknowledgement message, the second-to-last secondary zone player may then execute the previously received instruction and in turn, forward the acknowledgement message to the third-to-last secondary zone player on the CCL. This sequence of secondary zone players receiving the acknowledgement message, executing the previously received instruction, and forwarding the acknowledgement message in reverse order of the CCL may continue until the primary zone player receives the acknowledgement message. Once the primary zone player receives the acknowledgement and executes the instruction, each zone player in the bonded zone will have executed the instruction.

In another example, a confirmed communication (CC) method may be implemented such that the primary zone player communicates with each of the secondary zone players in a bonded zone. The CC method may be implemented for communicating instructions that are to be executed whether or not every zone player has received the instruction. In one case, the primary zone player sends the instruction to each secondary zone player of the bonded zone individually, and in turn requests an acknowledgement message from each secondary zone player upon execution of the instruction. In another case, the primary player may send a broadcast instruction message to all secondary zone players in the bonded zone, and in turn request an acknowledgement message from each secondary zone player upon execution of the instruction.

VI. Device Playback Failure Recovery

As discussed previously, systems 200, 202, 204, 300, 400, and 500 in system environments 100 and 150 may be implemented with device playback failure recovery, such that the system may provide graceful recovery when a playback device fails or is disengaged by automatically adjusting the playback of other playback devices in the system, thereby reducing the disruption of the user's audio experience to a minimum.

Figure 6A:
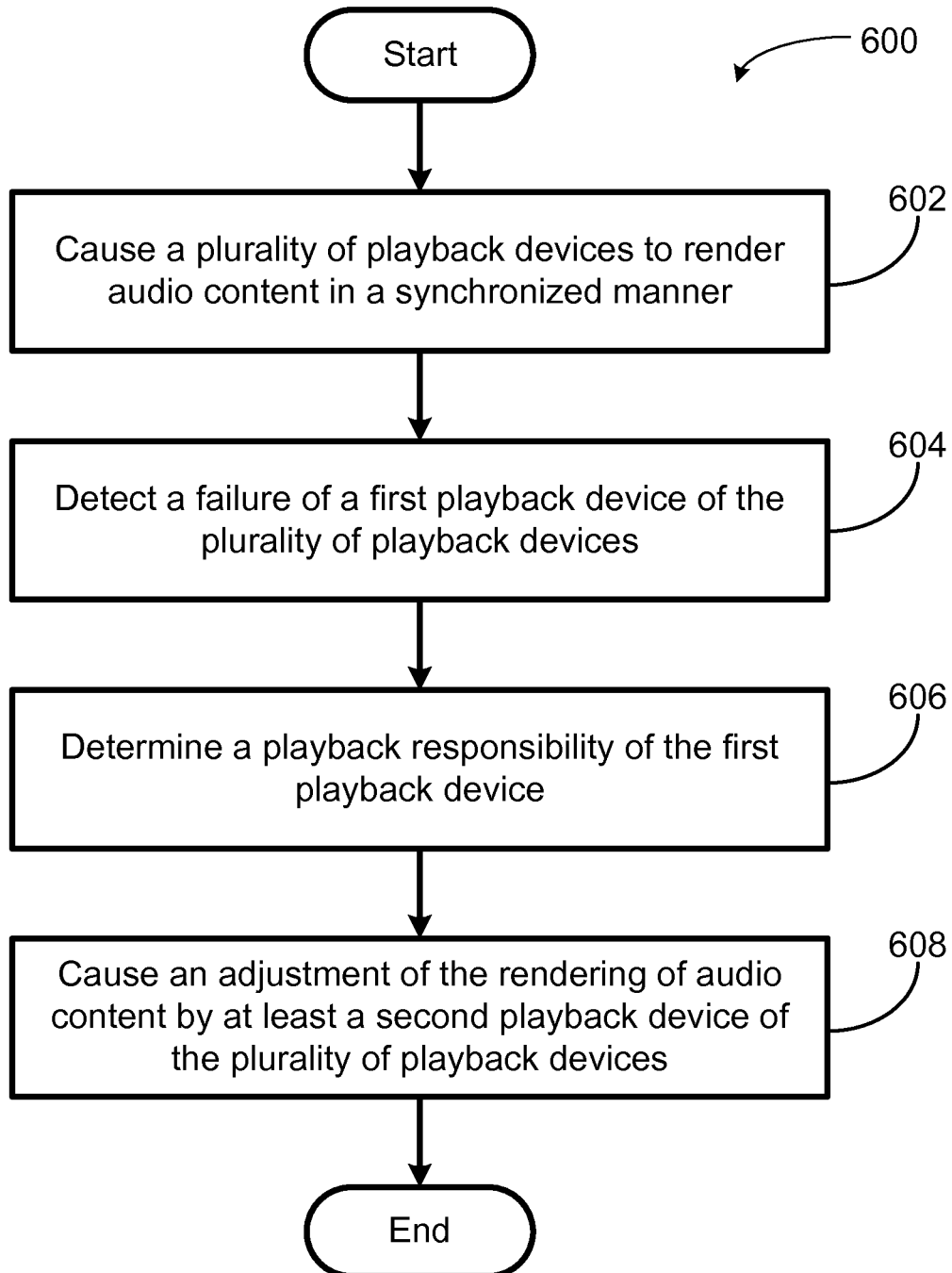
FIG. 6A shows a first illustrative block diagram for providing device playback failure recovery.

FIG. 6A shows an illustrative block diagram of an example method 600 for providing device playback failure recovery, in accordance with at least some embodiments described herein. Method 600 shown in FIG. 6A presents an embodiment of a method that could be used in the environments 100 and 150 with the systems 200, 202, 204, 300, 400, and 500 for example, and may be performed by a device, such as devices illustrated in FIGS. 3-5, or components of the device. Method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6A may represent circuitry that is wired to perform the specific logical functions in the process.

At block 602, the method 600 involves causing a plurality of playback devices to render audio content in a synchronized manner. As discussed previously, the audio content may come from many different sources, including local content on the Local Area Network (LAN), content on the controllers, or even "cloud-based" content from the internet.

In one example, plurality of playback devices may be zone players in a bonded zone, as described previously. Consistent with the descriptions above, the audio content may include multiple audio channels and multiple audio frequency ranges. For example, the audio content may be a stereo music track having a left channel and a right channel. The music track may further include multiple recording tracks of different instruments having different frequency ranges. For instance, the music track may include a mid-frequency vocal track, a mid-frequency guitar track, and a low-frequency bass guitar track. Also consistent with the descriptions above, the rendering of the audio content in a synchronized manner may involve playback with or without intentional delays, and further may involve group communication among the plurality of playback devices and updating and communicating of state variables for each of the playback devices.

In the example system environments 100 and 150, smart failure recovery in a bonded zone may rely on failure detection by one or more zone players in the bonded zone. At block 604, the method 600 involves detecting a failure of a first playback device of the plurality of playback devices. In one example, each zone player in the bonded zone may be configured to detect failure. In another example, a subset of the zone player in the bonded zone may be configured to detect failure.

The failure of a first playback device may involve an inability of the first play playback device to render at least one of the playback responsibilities of the first playback device, such a volume, one or more audio channels, or one of the one or more audio frequency ranges. In one scenario, the inability of the first zone player to render one of the playback responsibilities may be due to the first zone player disconnecting from the other zone players due to connectivity issues or simply because the first zone player has simply broken.

In this scenario, failure detection may be implemented such that a primary zone player or a controller may be configured to receive device status information from each of the plurality of zone players at a periodic interval. As such, when device status information has not been received from a particular playback device a number of periodic intervals, the particular playback device may be marked as having failed.

In another case, failure detection may be implemented at a zone player control software level using mechanisms to monitor the health of the zone players in a bonded zone. In this case, the control software level mechanism may involve the primary zone player sending a "topology monitor" message to each secondary zone player of the bonded zone, requesting a response. This topology monitor message may be sent periodically (e.g., every 15 seconds), and the primary zone player may use the response message from each secondary zone player to determine whether the corresponding secondary zone player is still active. In one instance, if a number of topology monitor messages were sent and subsequent response messages were not received, (e.g., if three consecutive topology messages were sent with no subsequent responses), the player may be marked as having failed.

In yet another case, failure detection may be implemented on the communication network level, relying on connectivity information of zone players in the bonded zone. In one instance, the wireless network over which the zone players communicate may be configured to maintain a mesh topology by periodically (e.g., on a 0.5 second level) sending a wireless probe message to all neighboring wireless devices, including the zone players, requesting a response. If a particular zone player disappears from the topology, then the particular zone player may be marked as having failed for the purposes of the bonded zone. In another instance, a spanning tree protocol (STP) may be implemented such that messages are periodically sent over the wired and wireless links to determine network reachability. In this instance, if a particular zone player disappears from the STP network, then the particular zone player may be marked as having failed for the purposes of the bonded zone.

In another scenario, a zone player from a bonded zone may normally be capable of rendering full-frequency range audio content. However, either due to mechanical or software reasons, the zone player may be unable to render the mid-frequency component of the audio content. As such, device information, such as the state variables discussed above associated with the zone player, indicating the capabilities of the zone player may be updated to reflect the change, and the updated device information may be subsequently communicated to the primary zone player, the controller, or other zone players in the bonded zone. In such a scenario, despite the zone player being otherwise functional and in communication with other zone players in the bonded zone, the change in the capabilities of the zone player may be considered a form of device failure, particularly in the case where the change in capabilities affect the current rendering of audio content by the zone player.

At block 606, the method of 600 involves determining a playback responsibility of the first playback device. As previously discussed, the playback responsibility of a zone player may include a playback volume, one or more audio channels, and one or more audio frequency ranges of the audio content the zone player was previously configured to render. As such, determining the playback responsibility of the first playback device may involve determining components of the audio content being rendered by the first playback device prior to the failure of first playback device. In one case, determining the playback responsibility of the first playback device may involve acquiring the state variable of the first playback device prior to the failure of the first playback device.

At block 608, the method of 600 involves causing an adjustment of the rendering of audio content by at least a second playback device of the plurality of playback devices. The adjustment of the rendering of audio content may be based on the playback responsibility of the first playback device. For instance, the adjustment of the rendering of audio content may involve adding the playback responsibility of the first playback device to the rendering of the audio content by the at least second playback device. In other words, when one or more zone players of a bonded zone becomes unresponsive, disappears, or is otherwise deemed to have failed, the remaining zone players in the bonded zone may be considered a new configuration of zone players for rendering the audio content.

In one example, the remaining zone players in the bonded zone may be configured to continue to play audio in synchrony with minimal (if any) audio disruption, and may further be configured to be automatically re-equalized to compensate for failure of the one or more zone players. In another example, the remaining zone players in the bonded zone may be configured to automatically re-distribute the channel playback responsibility of the failed zone player among the remaining players in the bonded zone to compensate for the new configuration. In yet another example, the remaining zone players in the bonded zone may be configured to be automatically re-equalized as well as to automatically re-distribute the channel playback responsibility of the failed zone player. Whichever the case, the failed zone player may be removed from the CCL and may not be expected to participate in any confirmed communication until the failed zone player becomes fully active again.

As stated above, the status of each zone player in a bonded zone may be stored in a state variable. In one case, the status of each zone player may be stored on each zone player in the bonded zone. In another case, the status of each zone player may be stored only on the primary zone player. When a zone player is added to a bonded zone, or when the bonded zone is initially created, such as by a user through a controller, the zone players of the bonded zone may be initially set as having an 'active' status. If at any point during operation, a zone player becomes unresponsive or is otherwise deemed to have failed, the status of the zone player becomes "failed." If at a subsequent time the unresponsive or failed player becomes active again, the state variable may be updated to reflect the new "active" status.

Also as discussed above, the state variable associated with a zone player may also include audio playback capabilities of the zone player. For example, the audio channels (e.g., left, right, center, subwoofer, etc.) supported by the zone player may be stored in a "channel capabilities" state variable. Furthermore, the time delay for each channel (e.g., left, right, center) may be stored in a "channel delay" state variable. In addition, the playback frequency range of a zone player may be stored in one or more state variables.

As suggested above, a zone player may store the associated state variable on a data storage medium on the zone player. In such a case, a controller or a primary zone player may acquire the state variables of the remaining zone players in the bonded zone, and identify the capabilities of each of the remaining zone players. The controller or primary zone player may then use the acquired information to automatically generate failback recovery zone player configurations, and updated playback responsibilities for the remaining zone players, as discussed below.

Automatic Equalization

As stated above, the remaining zone players in the bonded zone may be configured to continue to play audio in synchrony with minimal (if any) audio disruption, and may further be configured to be automatically re-equalized to compensate for failure of the one or more zone players. In one example, the re-equalization may involve redistributing a portion of the frequency range responsibility of the failed zone player to the remaining players. In another example, the re-equalization may involve automatically changing the volume levels of the remaining players. In yet another example, the re-equalization may involve re-calibration of the remaining zone players in the bonded zone as a new configuration.

Automatic-Equalization: Frequency

In one example, if a zone player of a bonded zone that was designated to play a subset of the full-frequency range was determined to have failed, the remaining zone players in the bonded zone may be configured to automatically change their configurations to reproduce (if possible) the frequency range previously rendered by the failed player. For instance, a bonded zone may include two full-frequency range zone players (e.g., two zone players such as "PLAY:3," "PLAY: 5," or "CONNECT:AMP" players offered by Sonos, Inc. of Santa Barbara, Calif.) and one low-frequency range zone player (e.g., a subwoofer such as "SUB" offered by Sonos, Inc. of Santa Barbara, Calif.), such that the two full-frequency range zone players may be configured to play the mid-frequency range and high-frequency range audio content components above a cutoff frequency, and the low-frequency range zone player may be configured to play the low-frequency range audio content component below the cutoff frequency. In this instance, if the low-frequency range zone player has failed, then the two full-frequency range zone players may adjust their playback configuration to render the full-frequency range to compensate for the missing low-frequency range from the failed low-frequency range zone player.

In one case, the full-frequency range audio content may be received at each zone player in the bonded zone, and each device may be responsible for filtering the full-frequency range audio content according to the respective playback responsibilities of each zone player. Upon detecting failure of a zone player in the bonded zone, the remaining zone players may be configured to adjust their audio filters to play a broader frequency range (if possible) to compensate for the failed zone player. In another case, the full-frequency range audio content may be received and filtered at the primary zone player according to the playback responsibilities of each zone player before the audio content is distributed to the corresponding zone players. Upon detecting failure of a zone player in the bonded zone, the primary zone player may adjust the audio filters such that audio content having broader frequency ranges may be distributed to the zone players in the bonded zone to compensate for the failed zone player.

Automatic-Equalization: Volume

In one example, the remaining zone players in the bonded zone may be configured to automatically adjust playback volumes to balance the overall output volume of the remaining bonded zone players. For instance, a bonded zone may include two full-frequency range zone players (e.g., two zone players such as "PLAY:3," "PLAY:5," or "CONNECT: AMP" players offered by Sonos Inc. of Santa Barbara) and one low-frequency range zone player (e.g., a subwoofer such as "SUB" offered by Sonos Inc. of Santa Barbara) such that the two full-frequency range zone players may be configured to play the mid-frequency range and high-frequency range audio content components above a cutoff frequency, and the low-frequency range zone player may be configured to play the low-frequency range audio content component below the cutoff frequency. In this case, if one of the full-frequency range zone players was deemed to have failed, then the remaining full-frequency range zone player may be configured to increase the respective output volume level and the low-frequency range zone player may be configured to decrease the respective output volume level to compensate and balance the missing rendering of the mid-frequency range and high-frequency range audio content components previously rendered by the failed zone players.

In one case, each zone player in the bonded zone may be configured to individually control their respective output volumes. Upon detecting failure of a zone player in the bonded zone, the remaining zone players may be configured to adjust their respective volume levels proportionally to maintain an output volume level similar to the output level of the system before the zone player failed. In another case, the primary zone player may be responsible for adjusting the output volume level of the audio content before the audio content is distributed to the corresponding zone players. Upon detecting failure of a zone player in the bonded zone, the primary zone player may be configured to adjust the volume of the audio content for each of the remaining zone players before distributing the audio content to the secondary zone players to compensate for the failed zone player.

Automatic-Equalization: System Configured Parameters

In one example, the bonded zone may have a custom audio setting manually calibrated by a user using an interactive user interface (UI). In this example, if a zone player of a bonded zone is deemed to have failed, the audio setting of the bonded zone may be configured to revert to a default setting, and the user may be alerted, and invited to manually recalibrate the audio setting of the bonded zone. In one case, the default setting may be determined based on the remaining zone players in the bonded zone. The default setting may be stored on a data storage medium on each zone player, or on a subset of zone players in the bonded zone. In one instance, the user may be alerted to recalibrate the bonded zone audio setting using a visual indication (e.g., a message or alert symbol) displayed on a display screen of a controller. In another instance, the user may be alerted to recalibrate the bonded zone audio setting using an audio tone or message that may be played by one or more zone players available (e.g., the remaining players in the bonded zone). In yet another instance, the user may be alerted to recalibrate the bonded zone audio setting using messaging over an external network, such as a text message, email, or voicemail message that may be transmitted over the public switched telephone network (PSTN) or internet. In this instance, the method of communication and contact information for reaching the user may be stored on a data storage medium on one or more zone players in the bonded zone.

In an instance as previously described, a bonded zone may include two full-frequency range zone players (e.g., two zone players such as "PLAY:3," "PLAY:5," or "CONNECT: AMP" players offered by Sonos Inc. of Santa Barbara) and one low-frequency range zone player (e.g., a subwoofer such as "SUB" offered by Sonos Inc. of Santa Barbara) such that the two full-frequency range zone players may be configured to play the mid-frequency range and high-frequency range audio content components above a cutoff frequency, and the low-frequency range zone player may be configured to play the low-frequency range audio content component below the cutoff frequency. Further, the phase and balance of the low-frequency range zone player may have been configured by a user using a UI provided on the controller. In this instance, if one of the full-frequency range zone players was deemed to have failed, then the remaining full-frequency range players, and the subwoofer may automatically re-adjust their corresponding phase and balance to a default setting, while the user may be alerted and invited to recalibrate the bonded zone audio setting.

Automatic Channel Distribution

In one example, when one or more zone players of a paired player becomes unresponsive, disappears, or is otherwise deemed to have failed, the remaining zone players in the bonded zone may be configured to automatically redistribute the channel distribution to compensate for the new configuration, as discussed above. In one case, a bonded zone may include two zone players that are paired such that the first zone player plays the right channel audio component and the second zone player plays the left channel audio component. In this case, if the second zone player rendering the left channel audio component is deemed to have failed, then the first zone player rendering the right channel audio component may be configured to continue to play the right channel audio component without disruption, and further, automatically redistribute the channel distribution of the audio content such that the first zone player now also renders the left channel audio component.

In another example, a bonded zone may include six zone players that are paired to play 5.1 channel audio content, such as that of system environment 150 shown in FIG. 1B. In this example, the first zone player 116 may render the left front channel audio component, the second zone player 118 may render the right front channel audio component, the third zone player 120 may render the center channel audio component, the fourth zone player 154 may render left rear channel audio component, the fifth zone player 156 may render the right rear channel audio component, and the sixth zone player 152 may render the LFE audio component. Further, the bonded zone players may be positioned in the system environment 150 such that the audio playback on the fifth zone player 156 rendering the right rear channel audio component may be configured to produce a longer playback delay than that of the fourth zone player 154 rendering the left rear channel audio component.

In this case, if the fifth zone player 156 playing the right rear channel audio component is deemed to have failed, the remaining players may be configured to continue to render the audio content without disruption. Further, the fourth zone player 154 rendering the left rear channel audio content may be configured to automatically redistribute the channel distribution of the rear speakers such that it now renders both the left rear channel audio component as well the right rear channel audio component. In such as case, the fourth zone player 154 may further be configured to further delay the playback of the right rear channel audio component relative to the left rear channel to compensate for the original delay difference between the rear channels.

In yet another example, a multi-channel audio stream may be received at each zone player of a paired player. In this case, each zone player in the bonded zone may be responsible for removing from the audio stream audio channels that the corresponding zone player is not responsible for rendering. For instance, a zone player configured to render only the right channel audio component may remove the left channel audio component from the multi-channel audio stream before rendering the audio content. Upon detecting failure of a zone player in the bonded zone, the remaining zone players may be configured to adjust the corresponding playback channel distribution to compensate for the failed zone player. In a further example, a multichannel audio stream may be received and subsequently filtered by the primary zone player before the primary zone player distributes filtered audio streams to corresponding secondary zone players of the bonded zone. Upon detecting failure of a zone player in the bonded zone, the primary zone player may be configured to adjust the channel distribution and filtering of the audio stream such that the audio stream distributed to the remaining zone players of the bonded zone may compensate for the failed player.

Figure 6B:
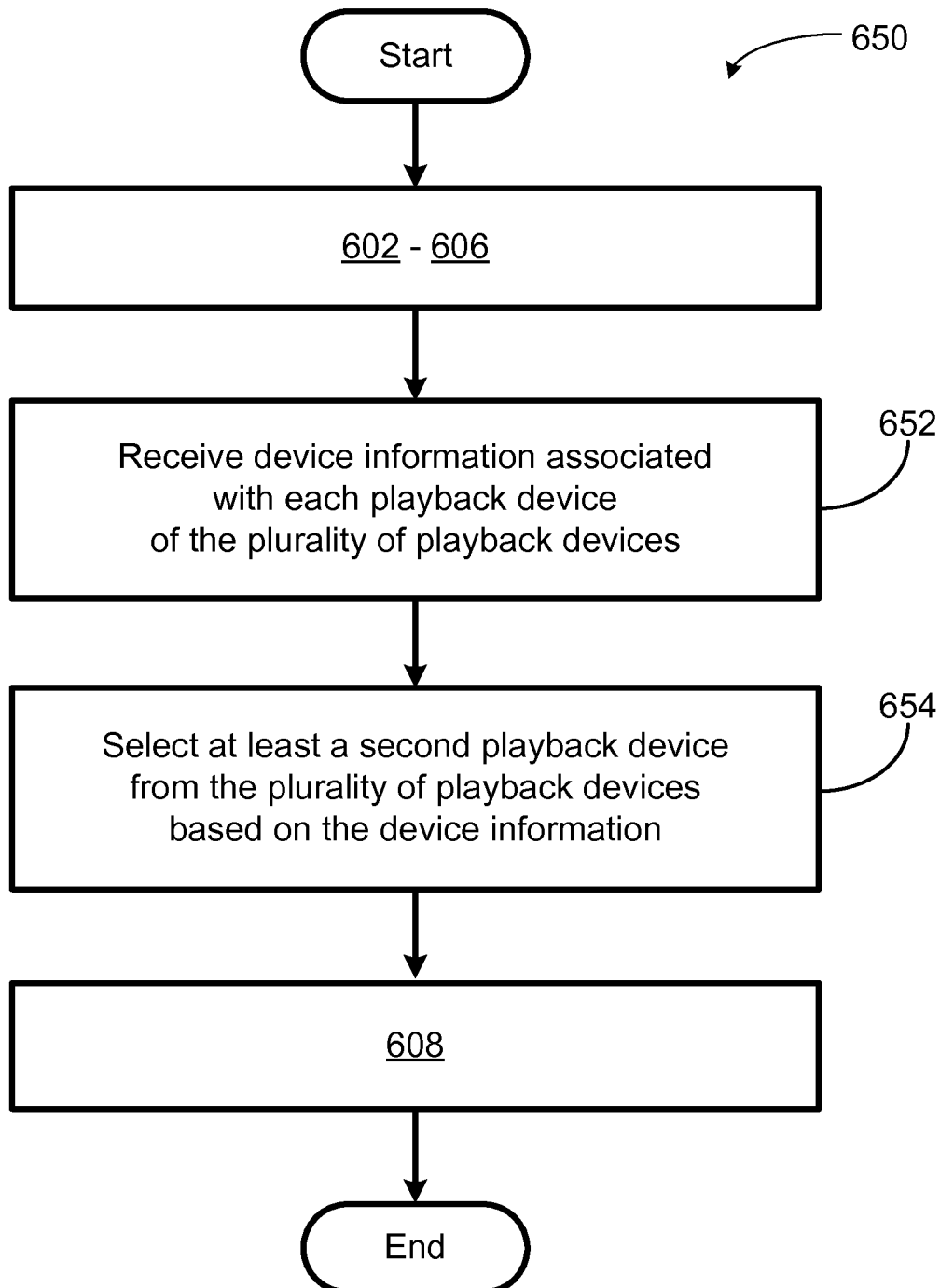
FIG. 6B shows a second illustrative block diagram for providing device playback failure recovery.

FIG. 6B shows an illustrative block diagram of another example method 650 for providing device playback failure recovery, in accordance with at least some embodiments described herein. Method 650 shown in FIG. 6B presents an embodiment of a method that could be used in the environments 100 and 150 with the systems 200, 202, 204, 300, 400, and 500 for example, and may be performed by a device, such as devices illustrated in FIGS. 3-5, or components of the device. Method 650 may include one or more operations, functions, or actions as illustrated by one or more of blocks 602-608, 652, and 654. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

As shown, method 650 includes blocks 602-608 of method 600 described above and shown in FIG. 6A. In addition to blocks 602-608, method 650 further includes blocks 652 and 654 to further illustrate how one or more playback devices/zone players may be selected to adjust playback for the purpose of compensating for a failed zone player.

At block 652, the method 650 involves receiving device information associated with each playback device of the plurality of playback devices. As discussed previously, the device information may indicate playback capabilities of each of the playback devices of the plurality of playback devices. As such, upon detecting that a zone player has failed at block 604, the primary zone player or controller may query each of the remaining zone players in the bonded zone to acquire device information indicating capabilities of each zone player. As also discussed above, the device information and/or state variable associated with a zone player may already be stored on the primary zone player, in which case the primary zone player may not need to query the other zone players.

At block 654, the method 650 involves selecting at least a second playback device from the plurality of playback devices based on the device information. As suggested previously, the selection of at least the second playback device may further involve determining which of the playback devices/zone players in the plurality of zone players is capable of compensating for the failure of the failed zone player. As such, upon determining the playback responsibility of the failed playback device at block 606, the primary zone player or controller may determine, based on the device information for each zone player in the bonded zone, which zone players are capable of compensating for the failure of the failed zone player. For example, if the failed zone player was a low-frequency range zone player, such as a subwoofer, then one or more zone players for compensating for the failed zone player may be selected from the plurality of zone players based on capabilities of the respective zone players to render the low-frequency range audio component.

VI. Device Playback Redistribution

As discussed in the previous section, device playback failure recovery may be implemented such that the audio content playback may be redistributed to one or more other playback devices when a playback device in a group of playback devices fails. In some scenarios, device playback redistribution may further be implemented when a new playback device is added to the group of playback devices. In one case, the new playback device may be a previously failed playback device that has reconnected. In a sense, whether a new playback device has been added, or whether a previously failed playback device has reconnected, the audio content rendering by a bonded zone may be configured to adjust in response to a new configuration of playback devices involving at least one additional playback device.

Figure 7:
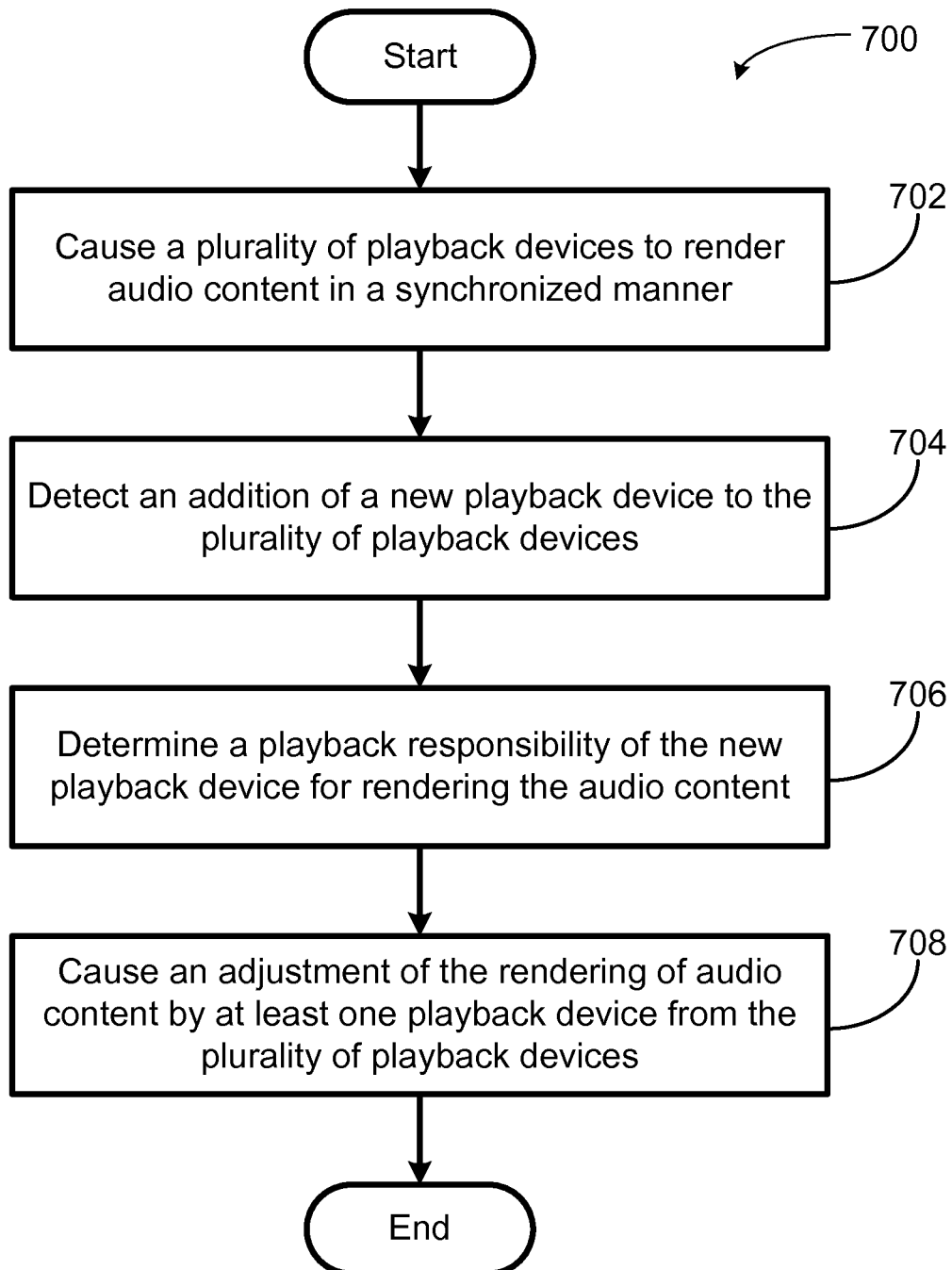
FIG. 7 shows a first illustrative block diagram for providing device playback redistribution.

FIG. 7 shows an illustrative block diagram of an example method 700 for providing device playback redistribution, in accordance with at least some embodiments described herein. Method 700 shown in FIG. 7 presents an embodiment of a method that could be used in the environments 100 and 150 with the systems 200, 202, 204, 300, 400, and 500 for example, and may be performed by a device, such as devices illustrated in FIGS. 3-5, or components of the device. Method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 702, the method 700 involves causing a plurality of playback devices to render audio content in a synchronized manner. In one example, the rendering of audio content by the plurality of playback devices in a synchronized manner may be similar to the rendering of audio content in a bonded zone as described above in reference to block 602 of method 600. As discussed, the rendered audio content may include multiple audio channels and multiple audio frequency ranges, and may come from many different sources, including local content on the Local Area Network (LAN), content on the controllers, or even "cloud-based" content from the internet.

At block 704, the method 700 involves detecting an addition of a new playback device to the plurality of playback devices. In one example, a primary playback device/zone player may receive a message from the new playback device indicating device status information associated with the new playback device. In some cases, the same message may be received by some or all of the other playback devices/zone players in a bonded zone.

In one case, the new playback device may not be considered to have been added to the bonded zone until the new playback device has communicated with the primary playback device/zone player or other playback devices at regular intervals for a certain amount of time. For instance, each zone player in a bonded zone may be configured to be in periodic communication with the primary zone player. In this instance, a one-time communication may not be sufficient for a zone player to be added to the bonded zone. Rather, the bonded zone may be configured such that a new zone player is added to the bonded zone after a certain number of periodic communications (e.g. 3-5 iterations).

In one example, the new playback device may be a recently acquired and newly installed zone player, or a zone player being added to the bonded zone by request of the user. In one example, the new playback device may be a previously failed playback device as described previously.

At block 706, the method 700 involves determining a playback responsibility of the new playback device for rendering the audio content. As discussed above, the audio content may include multiple channels and audio frequency ranges. As such, the playback responsibility of the new playback device may indicate a playback volume, one or more audio channels, and one or more audio frequency ranges of the audio content to be rendered by the new playback device.

Further, the playback responsibility of the new playback device may be determined based on the audio content being rendered. Naturally, the playback responsibility of the new playback device may also be determined based on capabilities of the new playback device. In one case, the capabilities of the new playback device may be acquired through device information received from the new playback device. In one example, as mentioned above, the device information may be received as part of regular, periodic communication between the new playback device and the primary playback device. In another example, the primary playback device/zone player in the bonded zone may query the new playback device for device information once the new playback device has been added to the bonded zone, and accordingly determine playback responsibilities of the new playback device based on the received device information.

As indicated above, the new playback device may in fact, be a previously failed playback device that has become active again, or that has reconnected. In this case, the playback responsibility of the new playback device may simply be the playback responsibility of the playback device before failing.

At block 708, the method 700 involves causing an adjustment of the rendering of audio content by at least one playback device from the plurality of playback devices. In one example, the adjustment may involve removing the playback responsibility of the new playback device from the rendering of the audio content by the at least one playback device. In one case, removing the playback responsibility of the new playback device may be part of an adjustment of playback responsibilities for each zone player in the bonded zone as a result of the addition or reconnection of a zone player. For instance, if a full-frequency range zone player is rendering audio content at a particular volume when a new playback device having low-frequency range rendering capabilities, the full-frequency range zone player may be configured to reduce the volume of, or even eliminate the rendering of the low-frequency audio component, and allowing the new playback device to render the low-frequency audio component of the audio content.

In one example, when one or more players of a bonded zone is added or reconnects, the original zone players in the bonded zone may continue to render audio content in synchrony with minimal (if any) audio disruption. The zone players in the bonded zone may further be configured to automatically re-equalize to compensate for the new configuration. Similarly, the remaining players in the bonded zone may automatically re-distribute the channel assignments among the players of the bonded zone to compensate for the new configuration.

In one case, re-equalization may involve redistributing portion of the frequency range from the zone players in the bonded zone to the new or recovered player. In another case, the re-equalization may involve automatically changing the volume levels of the players to compensate for the recovered player. In yet another example, the re-equalization may involve resetting calibrated audio settings to default audio setting values.

In one example, the full-frequency range audio content may be configured to be received by each zone player in the bonded zone such that each zone player may be responsible for filtering the full-frequency range audio content according to the playback responsibilities of the respective zone players. Upon detecting the addition or recovery of a zone player in the bonded zone, the original zone players may adjust the filtering of the received full-frequency range audio content according to an adjusted playback responsibility (e.g. narrower playback frequency range or lower volume) compensating for the addition or recovery of the zone player.

In another example, the full-frequency range audio content may be received by the primary zone player and filtered according to the playback responsibilities of each secondary zone player in the bonded zone before distributing the filtered audio content to the corresponding secondary zone players. In this case, upon detecting the addition or recovery of a zone player in the bonded zone, the primary zone player may adjust the filtering of the full-frequency range audio content according to adjusted playback responsibilities (e.g. narrower playback frequency ranges or lower volumes) of each secondary zone player before distributing the filtered audio content to the corresponding secondary zone players.

In another example, each zone player may be responsible for controlling a respective output volume level. Upon detecting the addition or recovery of a zone player in the bonded zone, the zone players may be configured to re-adjust the respective output volume level to the output volume level according to the adjusted playback responsibility of the zone player.

In another case, the primary zone player may be responsible for adjusting the volume output level of the audio content according to playback responsibilities of the secondary zone players before distributing the adjusted audio content to the corresponding secondary zone players. In this case, upon detecting the addition or recovery of a zone player in the bonded zone, the primary zone player may re-adjusts the output volume level of the audio content for each of the players according to the adjusted playback responsibility of the secondary zone players, before distributing the adjusted audio content to the corresponding secondary zone players.

In yet another example, audio settings for the bonded zone may have been calibrated using an interactive user interface (UI). In this case, if a zone player in a bonded zone has reconnected after previously failing, the audio settings may be configured to revert to the originally calibrated audio setting, prior to the zone player failing. As previously discussed, the originally calibrated audio setting may be stored on a data storage medium on each zone player, a subset of zone players, or only the primary zone player of the bonded zone.

In general, the adjustment of playback responsibilities may be performed in an analogous manner to when playback responsibilities were determined when initially setting up the bonded zone, as described previously. On the other hand, in the case the new playback device/zone player is a previously failed playback device, the playback responsibilities of each zone player in the bonded zone may simply be reverted or adjusted back to the playback responsibilities of the zone players before the failure of the added zone player.

VII. Example Implementation of Device Playback Failure Recovery

Figure 8A:
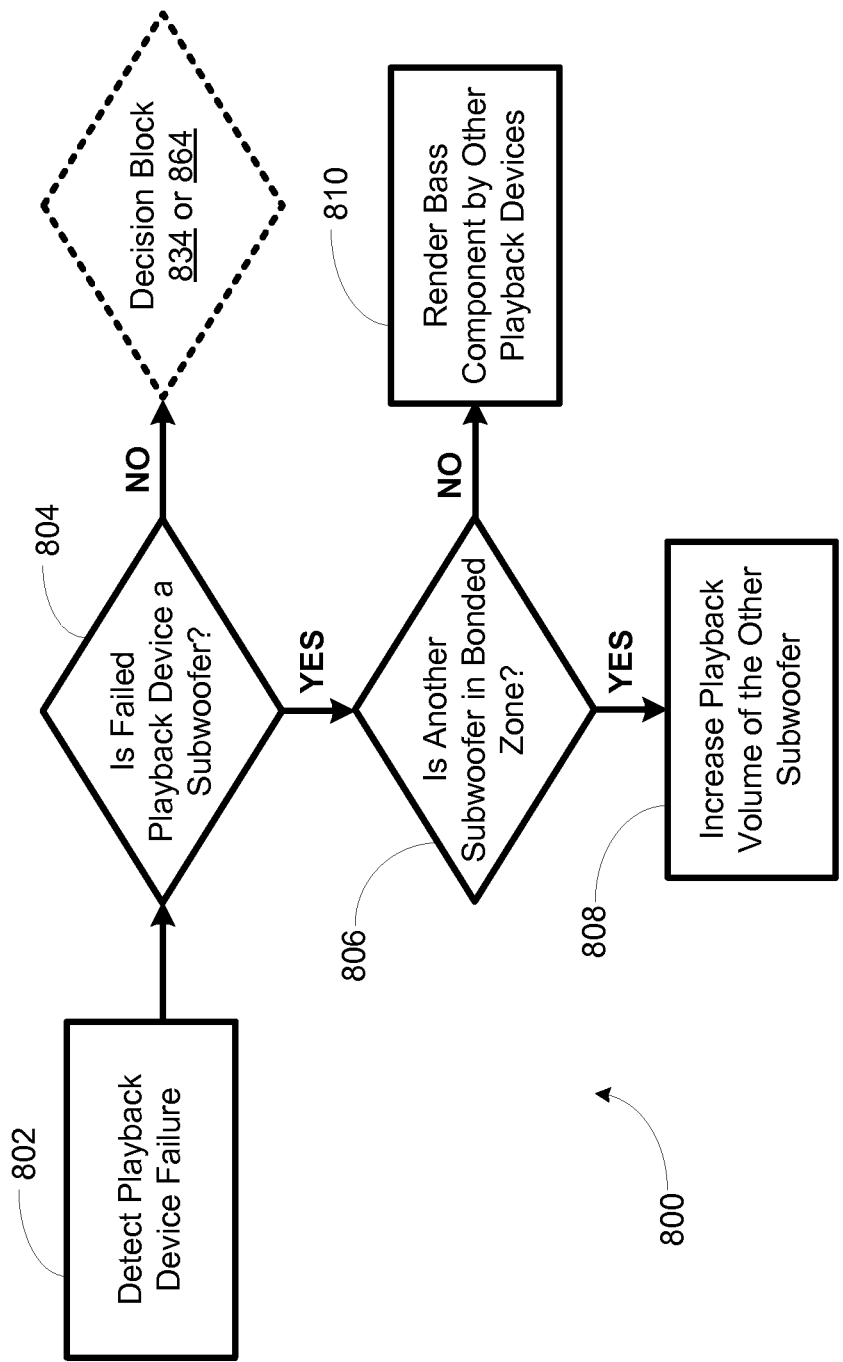
FIG. 8A shows an illustrative block diagram for implementing a first portion of a playback failure recovery system.
Figure 8B:
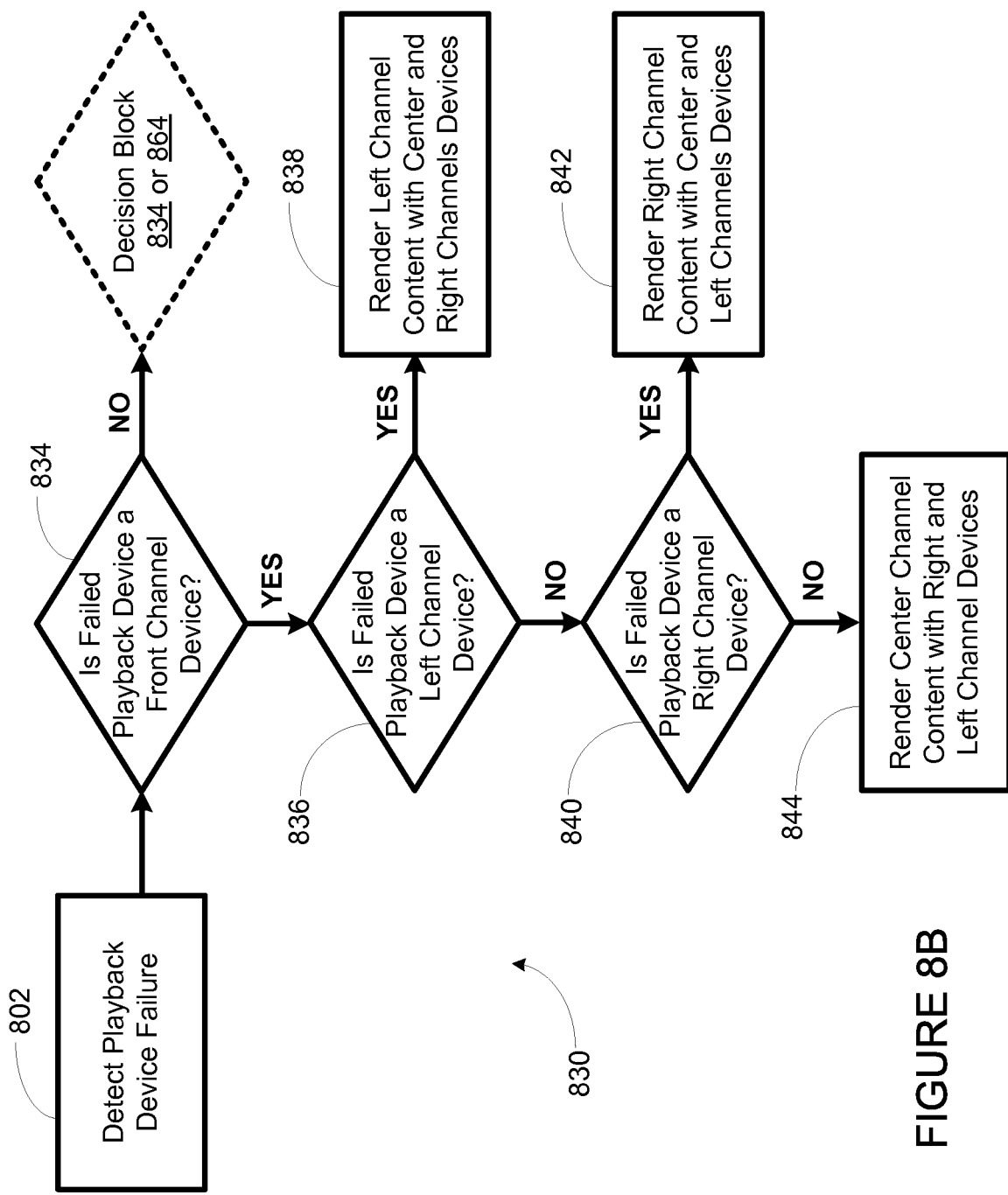
FIG. 8B shows an illustrative block diagram for implementing a second portion of the playback failure recovery system.
Figure 8C:
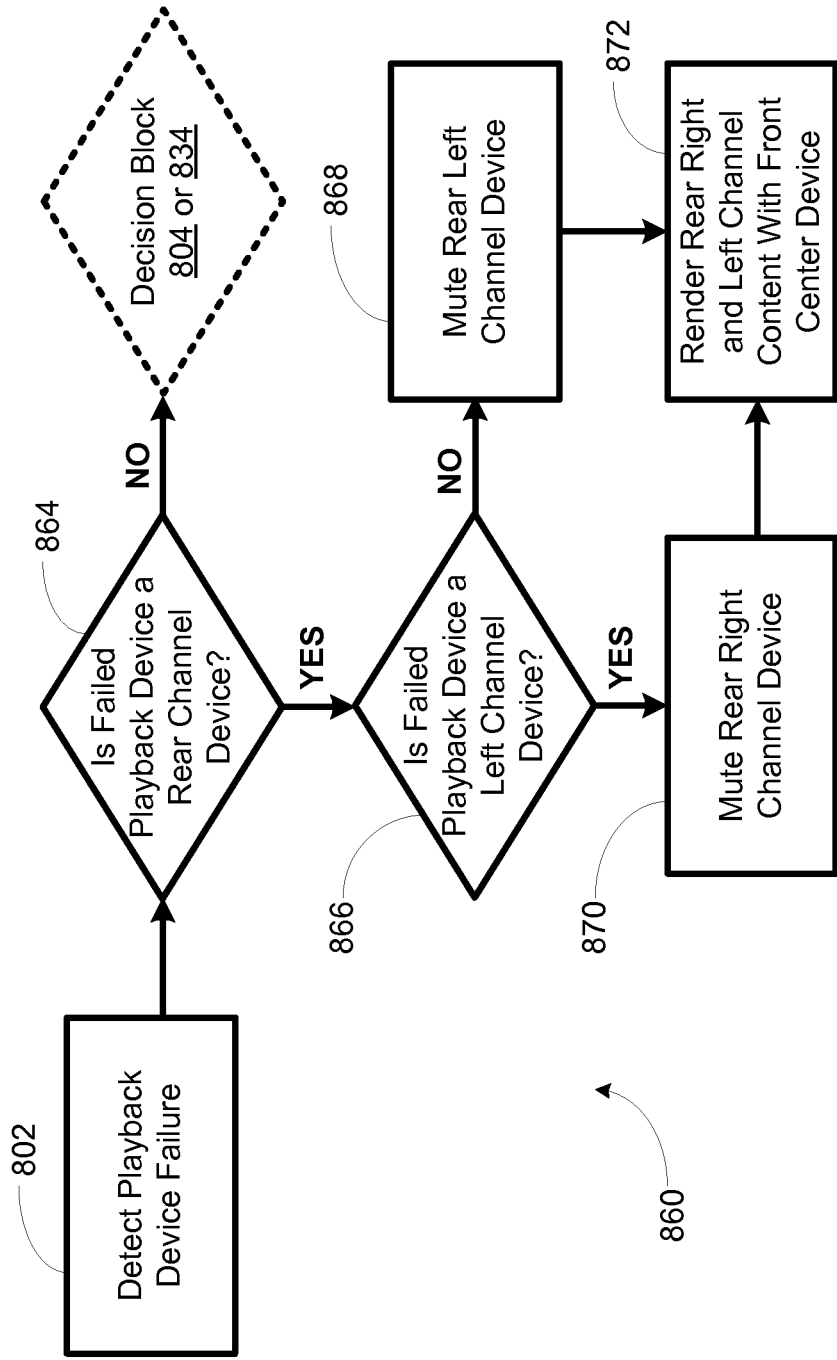
FIG. 8C shows an illustrative block diagram for implementing a third portion of the playback failure recovery system.

To further illustrate device playback failure recovery as discussed above, an example implementation of a device playback failure recovery system is provided in FIGS. 8A-8C. Methods 800, 830, and 860 shown in FIGS. 8A, 8B, and 8C may include one or more operations, functions, or actions as illustrated by one or more of blocks 802-872. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. In one case, the example implementation may be applied to the home theater room system environment 150 shown in FIG. 1B.

As shown in FIG. 8A, a first portion of the device playback failure recovery system implementation 800 includes action blocks 802, 808, and 810, and decision blocks 804 and 806. The first implementation portion 800 further references decision blocks 834 and 864, which will be discussed later with respect to FIGS. 8B and 8C, respectively.

At action block 802, playback device failure of a playback device in a bonded zone is detected. As discussed before, the detection of playback device failure may be based on suspended communication between a playback device and a primary device, for example. Once playback device failure has been detected, the system may proceed to decision block 804 to determine whether the failed playback device is a subwoofer, such as the zone player 152 of FIG. 1B. If the failed playback device is not a subwoofer, the system may proceed to decision blocks 834 or 864 of FIGS. 8B and 8C, respectively, which are discussed further below.

If the failed playback device is a subwoofer, the system may proceed to decision block 806 to determine whether another subwoofer in the bonded zone is available. If another subwoofer in the bonded zone is available, action block 808 may cause the other to increase a playback volume to compensate for the failed subwoofer. If another subwoofer is not available in the bonded zone, action block 810 may cause the other playback devices in the bonded zone to render the bass component of audio content previously rendered by the failed subwoofer.

As shown in FIG. 8B, a second portion of the device playback failure recovery system implementation 830 includes action block 802 as discussed in FIG. 8A as well as action blocks 838, 842, and 844, and decision blocks 834, 836, and 840. The second implementation portion 830 further references decision block 804 from FIG. 8A and decision block 864 which will be discussed later with respect to FIG. 8C.

As discussed above, action block 802 involves the detection of playback device failure. Once playback device failure has been detected, the system may proceed to decision block 834 to determine whether the failed playback device is a front channel playback device, such as the zone players 116, 118, or 120 of FIG. 1B. If the failed playback device is not a front channel playback device, the system may proceed to decision blocks 804 or 864 of FIGS. 8A and 8C, respectively.

If the failed playback device is a front channel playback device, the system may proceed to decision block 836 to determine whether the failed front channel playback device is a left channel playback device, such as the zone player 116 of FIG. 1B. If the failed front channel playback device is the left channel playback device, action block 838 may cause the right channel playback device, such as the zone player 118 of FIG. 1B, and the center channel playback device, such as the zone player 120 of FIG. 1B to render the left channel playback component previously rendered by the failed left channel playback device. In this case, the time delay and phase of the left channel playback component may be adjusted for playback by the right and center channel playback devices, as previously mentioned.

If the failed playback device is not the left channel playback device, the system may proceed to decision block 840 to determine whether the failed front channel playback device is a right channel playback device, such as the zone player 118 of FIG. 1B. If the failed front channel playback device is the right channel playback device, action block 842 may cause the left channel playback device, such as the zone player 116 of FIG. 1B, and the center channel playback device, such as the zone player 120 of FIG. 1B to render the right channel playback component previously rendered by the failed right channel playback device. In this case, the time delay and phase of the right channel playback component may be adjusted accordingly for playback by the left and center channel playback devices.

If the failed playback device is not the right channel playback device, indicating that the failed playback device is the center channel playback device, the system may proceed to action block 844 to cause the left channel playback device, such as the zone player 116 of FIG. 1B, and the right channel playback device, such as the zone player 118 of FIG. 1B to render the center channel playback component previously rendered by the failed center channel playback device. In the present implementation 830, the front channel playback devices may include only the left, center, and right channel playback devices. Similar implementations may be applied to systems having additional front channel playback devices.

As shown in FIG. 8C, a third portion of the device playback failure recovery system implementation 860 includes action block 802 as discussed in FIG. 8A as well as action blocks 868, 870, and 872, and decision blocks 864, and 866. The third implementation portion 860 further references decision blocks 804 and 834 from FIGS. 8A and 8C, respectively.

As discussed above, action block 802 involves the detection of playback device failure. Once playback device failure has been detected, the system may proceed to decision block 864 to determine whether the failed playback device is a rear channel playback device, such as the zone players 154 and 156 of FIG. 1B. If the failed playback device is not a rear channel playback device, the system may proceed to decision blocks 834 or 864 of FIGS. 8A and 8B, respectively.

If the failed playback device is a rear channel playback device, the system may proceed to decision block 866 to determine whether the failed rear channel playback device is a left channel playback device, such as the zone player 154 of FIG. 1B. If the failed rear channel playback device is the left channel playback device, action block 870 may cause the right channel playback device, such as the zone player 156 of FIG. 1B to be muted. After the right channel playback device has been muted, action block 872 may cause the front center playback device, such as the zone player 120 to render both the rear left and rear left components with an adjusted time delay and phase shift to compensate for the muting and failure of the rear channel devices. Similarly, if the failed rear channel playback device is not the left channel playback device, thereby indicating it is the rear right channel playback device that has failed, action block 868 may cause the left channel playback device, such as the zone player 154 of FIG. 1B to be muted. Accordingly, after the left channel playback device has been muted, action block 872 may cause the front center playback device to render both the rear left and rear left playback components.

As indicated above, the sequences of decision blocks and action blocks shown in FIGS. 8A, 8B, and 8C serve only as examples. For instance, decision blocks 804, 834, and 864 may be implemented in parallel, or in different orders to achieve a similar device playback failure recovery system. In addition, the playback devices in the bonded zone may be organized into different groups. For instance, instead of dividing the playback devices into front or rear playback devices, the playback devices may alternatively be divided into left, right, and/or center (including both the subwoofer and the center channel speaker) playback devices. Further, different methods to compensate for a failed playback device may be implemented. For instance, rather being muted when one rear playback device has failed, as described above, the other rear playback device may be configured to compensate (perhaps with assistance from the opposite side front playback device) for the failed rear playback device.

VIII. CONCLUSION

As discussed above, systems and methods are provided to offer a unique wired, wireless, or both wired and wireless audio solution that allows audio content to be played in a single listening zone or across multiple listening zones simultaneously and in synchrony.

In one example, a method is provided that comprises causing a plurality of playback devices to render audio content in a synchronized manner, detecting a failure of a first playback device of the plurality of playback devices, determining a playback responsibility of the first playback device, and causing an adjustment of the rendering of the audio content by at least a second playback device of the plurality of playback devices. The adjustment is based on the playback responsibility of the first playback device.

In another example, a method is provided that comprises causing a plurality of playback devices to render audio content in a synchronized manner, detecting an addition of a new playback device to the plurality of playback devices, determining a playback responsibility of the new playback device for rendering the audio content, and causing an adjustment of the rendering of the audio content by at least a one playback device from the plurality of playback devices. The adjustment is based on the playback responsibility of the first playback device.

In yet another example, a system is provided. The system includes one or more audio content sources, one or more audio playback devices, a controller, and a processing unit in communication with the audio content source, the one or more audio playback device, and the controller. The processing unit is configured to cause a plurality of playback devices to render audio content in a synchronized manner, detect a failure of a first playback device of the plurality of playback devices, determine a playback responsibility of the first playback device, and cause an adjustment of the rendering of the audio content by at least a second playback device of the plurality of playback devices. The adjustment is based on the playback responsibility of the first playback device.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A media playback system comprising a first wearable playback device and a second wearable playback device, the media playback system configured to perform operations comprising:

rendering multi-channel audio content as a particular playback configuration, wherein the first wearable playback device is configured to render one or more first audio channels of the multi-channel audio content and the second wearable playback device is configured to render one or more second audio channels of the multi-channel audio content, wherein one of the first wearable playback device and the second wearable playback device is configured as coordinator of the particular playback configuration to send playback and timing information to other wearable playback devices of the particular playback configuration;

while rendering the multi-channel audio content as the particular playback configuration, detecting a failure of the second wearable playback device; and based on detecting the failure of the second wearable playback device, configuring the first wearable playback device to additionally render at least a portion of the one or more second audio channels.

2. The media playback system of claim 1, wherein the particular playback configuration is a surround sound configuration and the multi-channel audio content is a surround sound audio track, the one or more first audio channels comprising a first surround channel and the one or more second audio channels comprising a second surround channel, and wherein configuring the first wearable playback device to additionally render at least the portion of the one or more second audio channels comprises configuring the first wearable playback device to additionally render the second surround channel.

3. The media playback system of claim 1, wherein the particular playback configuration is a stereo configuration and the multi-channel audio content is stereo audio content, the one or more first audio channels comprising a left channel and one or more second audio channels comprising a right channel, and wherein configuring the first wearable playback device to additionally render at least the portion of the one or more second audio channels comprises configuring the first wearable playback device to render the left and right channels of the stereo audio content.

4. The media playback system of claim 1, wherein detecting the failure of the second wearable playback device comprises detecting that the second wearable playback device is no longer connected to the first wearable playback device.

5. The media playback system of claim 1, wherein the media playback system connects to a mobile device via a network, wherein detecting the failure of the second wearable playback device comprises detecting that the second wearable playback device is no longer connected to the mobile device via the network.

6. The media playback system of claim 1, wherein detecting the failure of the second wearable playback device comprises receiving, via a network interface from the second wearable playback device, status information indicating that the second wearable playback device is in a failure status.

7. The media playback system of claim 1, wherein the first wearable playback device and the second wearable playback device are configured to be worn on a human head.

8. A method to be performed by a media playback system comprising a first wearable playback device and a second wearable playback device, the method comprising:
rendering multi-channel audio content as a particular playback configuration, wherein the first wearable playback device is configured to render one or more first audio channels of the multi-channel audio content and the second wearable playback device is configured to render one or more second audio channels of the multi-channel audio content, wherein one of the first wearable playback device and the second wearable playback device is configured as coordinator of the particular playback configuration to send playback and timing information to other wearable playback devices of the particular playback configuration;
while rendering the multi-channel audio content as the particular playback configuration, detecting a failure of the second wearable playback device; and
based on detecting the failure of the second wearable playback device, configuring the first wearable playback device to additionally render at least a portion of the one or more second audio channels.

9. The method of claim 8, wherein the particular playback configuration is a surround sound configuration and the multi-channel audio content is a surround sound audio track, the one or more first audio channels comprising a first surround channel and the one or more second audio channels comprising a second surround channel, and wherein configuring the first wearable playback device to additionally render at least the portion of the one or more second audio channels comprises configuring the first wearable playback device to additionally render the second surround channel.

10. The method of claim 8, wherein the particular playback configuration is a stereo configuration and the multi-channel audio content is stereo audio content, the one or more first audio channels comprising a left channel and one or more second audio channels comprising a right channel, and wherein configuring the first wearable playback device to additionally render at least the portion of the one or more second audio channels comprises configuring the first wearable playback device to render the left and right channels of the stereo audio content.

11. The method of claim 8, wherein detecting the failure of the second wearable playback device comprises detecting that the second wearable playback device is no longer connected to the first wearable playback device.

12. The method of claim 8, wherein the media playback system connects to a mobile device via a network, wherein detecting the failure of the second wearable playback device comprises detecting that the second wearable playback device is no longer connected to the mobile device via the network.

13. The method of claim 8, wherein detecting the failure of the second wearable playback device comprises receiving, via a network interface from the second wearable playback device, status information indicating that the second wearable playback device is in a failure status.

14. The method of claim 8, wherein the first wearable playback device and the second wearable playback device are configured to be worn on a human head.

15. A first wearable playback device of a media playback system comprising the first wearable playback device and a second wearable playback device, the first wearable playback device comprising:
a network interface;
an audio transducer;
one or more processors;
a housing, the housing carrying at least the network interface, the audio transducer, the one or more processors, and data storage having stored therein instructions executable by the one or more processors to cause the first wearable playback device to perform operations comprising:
rendering multi-channel audio content as a particular playback configuration, wherein the first wearable playback device is configured to render one or more first audio channels of the multi-channel audio content and the second wearable playback device is configured to render one or more second audio channels of the multi-channel audio content, wherein one of the first wearable playback device and the second wearable playback device is configured as coordinator of the particular playback configuration to send playback and timing information to other wearable playback devices of the particular playback configuration;
while rendering the multi-channel audio content as the particular playback configuration, detecting a failure of the second wearable playback device; and
based on detecting the failure of the second wearable playback device, configuring the first wearable playback device to additionally render at least a portion of the one or more second audio channels.

16. The first wearable playback device of claim 15, wherein the particular playback configuration is a surround sound configuration and the multi-channel audio content is a surround sound audio track, the one or more first audio channels comprising a first surround channel and the one or more second audio channels comprising a second surround channel, and wherein configuring the first wearable playback device to additionally render at least the portion of the one or more second audio channels comprises configuring the first wearable playback device to additionally render the second surround channel.

17. The first wearable playback device of claim 15, wherein the particular playback configuration is a stereo configuration and the multi-channel audio content is stereo audio content, the one or more first audio channels comprising a left channel and one or more second audio channels comprising a right channel, and wherein configuring the first wearable playback device to additionally render at least the portion of the one or more second audio channels comprises configuring the first wearable playback device to render the left and right channels of the stereo audio content.

18. The first wearable playback device of claim 15, wherein detecting the failure of the second wearable playback device comprises detecting that the second wearable playback device is no longer connected to the first wearable playback device.

19. The first wearable playback device of claim 15, wherein the media playback system connects to a mobile device via a network, wherein detecting the failure of the second wearable playback device comprises detecting that the second wearable playback device is no longer connected to the mobile device via the network.

20. The first wearable playback device of claim 15, wherein detecting the failure of the second wearable playback device comprises receiving, via the network interface from the second wearable playback device, status information indicating that the second wearable playback device is in a failure status.

21. The first wearable playback device of claim 15, wherein the first wearable playback device and the second wearable playback device are configured to be worn on a human head.

\* \* \* \* \*